(12) United States Patent
Pelletier et al.

(10) Patent No.: US 10,342,007 B2
(45) Date of Patent: Jul. 2, 2019

(54) METHOD AND APPARATUS FOR FAST ASSISTIVE TRANSMISSION OPERATION

(71) Applicant: InterDigital Patent Holdings, Inc., Wilmington, DE (US)

(72) Inventors: Benoit Pelletier, Montreal (CA); Lujing Cai, Morganville, NJ (US); Diana Pani, Montreal (CA); Christopher R. Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/910,564

(22) Filed: Mar. 2, 2018

(65) Prior Publication Data

US 2018/0192408 A1 Jul. 5, 2018

Related U.S. Application Data

(63) Continuation of application No. 15/166,364, filed on May 27, 2016, now Pat. No. 9,913,270, which is a
(Continued)

(51) Int. Cl.
*H04W 72/12* (2009.01)
*H04W 72/04* (2009.01)
(Continued)

(52) U.S. Cl.
CPC .......... *H04W 72/042* (2013.01); *H04B 7/024* (2013.01); *H04L 5/0005* (2013.01);
(Continued)

(58) Field of Classification Search
CPC ..... H04W 72/04; H04W 76/28; H04W 72/12; H04W 36/28; H04B 7/024; H04L 5/00
See application file for complete search history.

(56) References Cited

U.S. PATENT DOCUMENTS 8,249,810 B2 8/2012 Jones
8,391,311 B2 3/2013 Sung et al.
(Continued)

FOREIGN PATENT DOCUMENTS

JP 2008-172366 7/2008
WO 09/117660 9/2009
(Continued)

OTHER PUBLICATIONS

Alcatel-Lucent, Alcatel-Lucent Shanghai Bell, "Discussion on SFDC-HSDPA," R1-104383, 3GPP TSG-RAN WG1 Meeting #62, Madrid, Spain, Aug. 23-27, 2010.
(Continued)

*Primary Examiner* — Chi Ho A Lee
(74) *Attorney, Agent, or Firm* — Volpe and Koenig, P.C.

(57) ABSTRACT

A method for use in a wireless transmit/receive unit (WTRU) for receiving data over physical downlink shared channels from different cells, monitoring physical downlink control channels of a first cell for downlink control information associated with the WTRU, and recovering data from the physical downlink control channel in response to the downlink control information.

14 Claims, 17 Drawing Sheets

Related U.S. Application Data continuation of application No. 14/518,573, filed on Oct. 20, 2014, now Pat. No. 9,356,750, which is a continuation of application No. 13/248,343, filed on Sep. 29, 2011, now Pat. No. 8,867,442.

(60) Provisional application No. 61/389,102, filed on Oct. 1, 2010, provisional application No. 61/480,996, filed on Apr. 29, 2011, provisional application No. 61/523,007, filed on Aug. 12, 2011.

(51) Int. Cl.
*H04W 76/28* (2018.01)
*H04L 5/00* (2006.01)
*H04W 36/28* (2009.01)
*H04B 7/024* (2017.01)
*H04W 36/02* (2009.01)

(52) U.S. Cl.
CPC ......... *H04L 5/0035* (2013.01); *H04W 36/026* (2013.01); *H04W 36/28* (2013.01); *H04W 72/1289* (2013.01); *H04W 76/28* (2018.02)

(56) References Cited

U.S. PATENT DOCUMENTS

| | | | |
|---|---|---|---|
| 2004/0067776 A1 | 4/2004 | Kim | |
| 2006/0003702 A1* | 1/2006 | Nibe | H04L 1/0003 455/67.11 |
| 2006/0159061 A1 | 7/2006 | Takano et al. | |
| 2006/0193253 A1 | 8/2006 | Hamada | |
| 2006/0234702 A1 | 10/2006 | Wiberg et al. | |
| 2007/0049311 A1 | 3/2007 | Lindoff et al. | |
| 2007/0070908 A1 | 3/2007 | Ghosh et al. | |
| 2009/0034461 A1 | 2/2009 | Pelletier et al. | |
| 2009/0197606 A1 | 8/2009 | Bergman et al. | |
| 2009/0201885 A1 | 8/2009 | Kuroda et al. | |
| 2009/0303939 A1 | 12/2009 | Umesh et al. | |
| 2009/0316641 A1 | 12/2009 | Yamada et al. | |
| 2010/0091678 A1* | 4/2010 | Chen | H04B 7/024 370/252 |
| 2010/0130137 A1 | 5/2010 | Pelletier et al. | |
| 2010/0130219 A1 | 5/2010 | Cave et al. | |
| 2010/0272019 A1* | 10/2010 | Papasakellariou | H04B 7/0417 370/328 |
| 2010/0330989 A1 | 12/2010 | Song et al. | |
| 2010/0331037 A1* | 12/2010 | Jen | H04W 52/146 455/522 |
| 2011/0034175 A1 | 2/2011 | Fong et al. | |
| 2011/0077017 A1 | 3/2011 | Yu et al. | |
| 2011/0105107 A1 | 5/2011 | Kwon et al. | |
| 2011/0170516 A1 | 7/2011 | Hu et al. | |
| 2011/0194455 A1 | 8/2011 | Aminaka et al. | |
| 2011/0239072 A1 | 9/2011 | Cai | |
| 2011/0243007 A1 | 10/2011 | Xiao | |
| 2012/0026952 A1 | 2/2012 | Okubo et al. | |
| 2012/0044978 A1* | 2/2012 | Wang | H04B 7/024 375/219 |
| 2012/0076021 A1 | 3/2012 | Sambhwani | |
| 2012/0106480 A1 | 5/2012 | Shimomura et al. | |
| 2012/0108289 A1 | 5/2012 | Obuchi et al. | |
| 2012/0120903 A1 | 5/2012 | Kim et al. | |
| 2012/0201226 A1 | 8/2012 | Sambhwani et al. | |
| 2012/0250559 A1 | 10/2012 | Wu et al. | |
| 2012/0269140 A1 | 10/2012 | Nam et al. | |
| 2012/0327904 A1 | 12/2012 | Park et al. | |
| 2013/0058296 A1* | 3/2013 | Jitsukawa | H04W 72/0426 370/329 |
| 2013/0201947 A1 | 8/2013 | Wong | |

FOREIGN PATENT DOCUMENTS

| | | |
|---|---|---|
| WO | 09/132290 | 10/2009 |
| WO | 09/155480 | 12/2009 |

OTHER PUBLICATIONS

Dahlman et al., "4G: LTE/LTE-Advanced for Mobile Broadband," 1$^{st}$ Edition (Mar. 2011).

Nokia Siemens Networks, Nokia, "Multi-Cell Transmission Techniques for HSDPA," R1-104913, 3GPP TSG-RAN WG1 Meeting #62, Madrid, Spain, Aug. 23-27, 2010.

Qualcomm Europe, "Activation/De-Activation of Secondary UL Carrier in DC-HSUPA," 3GPP TSG-RAN WG1 #57, R1-091727, San Francisco, USA (May 4-8, 2009).

Qualcomm Europe, "HS-SCCH Orders for Secondary Carrier Activation/De-Activation in DC-HSUPA," 3GPP TSG-RAN WG1 #57, R1-091858, San Francisco, USA (May 4-8, 2009).

Qualcomm Europe," Activation/De-Activation of Secondary UL Carrier in DC-HSUPA," 3GPP TSG-RAN WG3 #64, R3-091222 (May 4-8, 2009).

Qualcomm Incorporated, "Further Details and Benefits of Deploying DC-HSDPA UEs in Single Frequency Networks," R1-104738, 3GPP TSG-RAN WG1 Meeting #62, Madrid, Spain, Aug. 23-27, 2010.

Qualcomm Incorporated, "On Deploying DC-HSDPA UEs in Single Frequency Networks," R1-103859, 3GPP TSG RAN WG1 Meeting #61-bis, Dresden, Germany, Jun. 29-Jul. 2, 2010.

Qualcomm Incorporated, "On deploying DC-HSDPA UEs in Single Frequency Networks," 3GPP TSG RAN WG1 Meeting #61-bis, R1-104157, Dresden, Germany, Jun. 29-Jul. 2, 2010.

Third Generation Partnership Project, "Technical Specification Group Radio Access Network; Multiplexing and Channel Coding (FDD) (Release 9)," 3GPP TS 25.212 v9.2.0, Mar. 2010.

Third Generation Partnership Project, "Technical Specification Group Radio Access Network; Multiplexing and Channel Coding (FDD) (Release 9)," 3GPP TS 25.212 v9.4.0, Dec. 2010.

Third Generation Partnership Project, "Technical Specification Group Radio Access Network; Multiplexing and Channel Coding (FDD) (Release 10)," 3GPP TS 25.212 v10.1.0, Dec. 2010.

Third Generation Partnership Project, "Technical Specification Group Radio Access Network; Synchronization in UTRAN Stage 2 (Release 9)," 3GPP TS 25.402 v9.0.0, Dec. 2010.

Third Generation Partnership Project, "Technical Specification Group Radio Access Network; Synchronization in UTRAN Stage 2 (Release 9)," 3GPP TS 25.402 v9.0.1, Mar. 2011.

Third Generation Partnership Project, "Technical Specification Group Radio Access Network; Synchronization in UTRAN Stage 2 (Release 10)," 3GPP TS 25.402 v10.1.0, Jun. 2011.

Third Generation Partnership Project, "Technical Specification Group Radio Access Network; Physical layer procedures (FDD) (Release 10)," 3GPP TS 25.214 v10.4.0 (Sep. 2011).

Third Generation Partnership Project, "Technical Specification Group Radio Access Network; Physical layer procedures (FDD) (Release 9)," 3GPP TS 25.214 v9.7.0 (Sep. 2011).

Third Generation Partnership Project, "Technical Specification Group Radio Access Network; Physical layer procedures (FDD) (Release 8)," 3GPP TS 25.214 v8.9.0 (Mar. 2010).

Third Generation Partnership Project, "Technical Specification Group Radio Access Network; Physical layer procedures (FDD) (Release 9)," 3GPP TS 25.214 v9.2.0 (Mar. 2010).

Third Generation Partnership Project, "Technical Specification Group Radio Access Network; Physical layer procedures (FDD) (Release 7)," 3GPP TS 25.214 V7.17.0 (Dec. 2010).

Third Generation Partnership Project, "Technical Specification Group Radio Access Network; Physical layer procedures (FDD) (Release 7)," 3GPP TS 25.214 V7.15.0 (Mar. 2010).

Third Generation Partnership Project, "Technical Specification Group Radio Access Network; Physical layer procedures (FDD) (Release 8)," 3GPP TS 25.214 V8.12.0 (Sep. 2011).

Third Generation Partnership Project, "Technical Specification Group Radio Access Network; Physical layer procedures (FDD) (Release 10)," 3GPP TS 25.214 V10.0.0 (Sep. 2010).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.3.0 (Sep. 2011).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.2.0 (Jun. 2010).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.3.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V10.0.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V10.4.0 (Jun. 2011).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.2.0 (Jun. 2011).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.3.0 (Sep. 2011).
Third Generation Partnership Project, "Technical Specification Group Radio Access Network; Evolved Universal Terrestrial Radio Access (E-UTRA); Radio Resource Control (RRC); Prorocol specification (Release 9)," 3GPP TS 36.331 V9.3.0 (Jun. 2010).
Third Generation Partnership Project, "Technical Specification Group Radio Access Network; Evolved Universal Terrestrial Radio Access (E-UTRA); Radio Resource Control (RRC); Prorocol specification (Release 9)," 3GPP TS 36.331 V10.2.0 (Jun. 2011).

* cited by examiner

METHOD AND APPARATUS FOR FAST ASSISTIVE TRANSMISSION OPERATION

CROSS REFERENCE TO RELATED APPLICATIONS

This application is a continuation of U.S. patent application Ser. No. 15/166,364 filed on May 27, 2016, which is a continuation of U.S. patent application Ser. No. 14/518,573, filed Oct. 20, 2014, which issued on May 31, 2016 as U.S. Pat. No. 9,356,750, which is a continuation of U.S. patent application Ser. No. 13/248,343, filed on Sep. 29, 2011, which issued on Oct. 21, 2014 as U.S. Pat. No. 8,867,442, which claims the benefit of U.S. Provisional Application No. 61/389,102, filed on Oct. 1, 2010; U.S. Provisional Application No. 61/480,996, filed on Apr. 29, 2011; and U.S. Provisional Application No. 61/523,007, filed on Aug. 12, 2011, the contents of which are hereby incorporated by reference herein.

BACKGROUND

The Third Generation Partnership Project (3GPP) wideband code division multiple access (WCDMA) initial release (R99) includes mechanisms for soft combining on the downlink for the dedicated channels (DCH). In soft combining operations, the wireless transmit/receive unit (WTRU) receives the same information via multiple Node Bs and combines the received information at the soft bit level. This was possible due to the constant over-the-air bit rate that was transmitted simultaneously across all Node Bs. When high-speed downlink packet access (HSDPA) was introduced in Release 5, this approach could no longer work in this context, because the instantaneous bit rate in HSDPA is determined locally at each Node B based on instantaneous channel measurements. The throughput increase obtained by using instantaneous channel measurements surpassed the macro-diversity gain obtained by soft combining.

More recently, the WCDMA standards in Release 8 introduced dual-cell HSDPA operations (DC-HSDPA), where the WTRU receives data simultaneously from two cells of the same Node B over adjacent frequencies in the same radio band. This approach allows doubling the WTRU downlink data rate (while also using double the bandwidth). In Release 9 and Release 10 of the standards, the concept was extended to support multi-band operations and up to four simultaneous downlink carriers. While this approach improves the WTRU throughput across the cell, it does so at the expense of additional bandwidth and does not provide significant system-wide gain. For WTRUs experiencing cell-edge conditions, other techniques may provide improved coverage while not necessitating the additional bandwidth.

Other approaches have been proposed to take advantage of the presence of the second or multi-receiver chain (necessary for multi-cell HSDPA, e.g., 2C/4C HSDPA, operations) to receive over at least two different cells, but in the same frequency to improve the reception throughput at the cell edge or the sector edge, potentially increasing spectral efficiency. This gain may be realized by using multipoint (or multi-cell) transmission/reception of data from geographically separated cells (points) in the same frequency and/or different frequencies. This form of operation is referred to as multipoint HSDPA operation. It is noted that single-frequency DC-HSDPA (SF-DC-HSDPA) is one example embodiment of multipoint HSDPA.

Approaches to provide throughput gains for multipoint HSDPA may be loosely grouped into four different categories (source switching, soft combining, source multiplexing, or multi-flow aggregation) based on the number of different transport blocks the WTRU may receive at each transmission time interval (TTI). In source switching, the WTRU receives data from a single source at a time, but may receive data from multiple sources over time. In soft combining, the WTRU receives the same data from multiple sources and combines the soft information for improved detection performance. In source multiplexing, the WTRU receives different data from multiple sources simultaneously. All of these approaches attempt to improve WTRU throughput at the cell edge or the sector edge.

Depending on the mode of the multipoint DC-HSDPA operations, the WTRU has to perform a number of tasks to demodulate the data carried on the high speed physical downlink shared channel (HS-PDSCH). To do so at a reasonable complexity, it is preferable for the Node B to transmit basic information to help the WTRU decide what part of the code space to decode, and how it is modulated and encoded in general. This signaling and the associated WTRU actions may take different forms, depending on the multipoint HSDPA mode of operation.

SUMMARY

A method for coordinating discontinuous reception (DRX) operation between a primary serving cell and a secondary serving cell includes configuring DRX parameters for the primary serving cell and the secondary serving cell, performing a radio interface synchronization procedure to align a connection frame number (CFN) in both the primary serving cell and the secondary serving cell, and coordinating DRX reception patterns for the primary serving cell and the secondary serving cell using the aligned CFN.

A method for notification-based DRX activation or deactivation includes transmitting an activation or deactivation order for a primary serving cell from a Node B of the primary serving cell to a wireless transmit/receive unit (WTRU), transmitting a corresponding DRX activation or deactivation notification from the Node B of the primary serving cell to a serving radio network controller (SRNC), receiving a DRX activation or deactivation command at a Node B of a secondary serving cell from the SRNC, and transmitting an activation order for the secondary serving cell from the Node B of the secondary serving cell to the WTRU.

A method for notification-based DRX activation or deactivation includes transmitting a DRX activation or deactivation request from a Node B of a primary serving cell to a serving radio network controller (SRNC), receiving a DRX activation or deactivation grant at the primary Node B from the SRNC, and transmitting a DRX activation or deactivation order for the primary serving cell and a secondary serving cell from the primary Node B to a wireless transmit/receive unit (WTRU).

BRIEF DESCRIPTION OF THE DRAWINGS

A more detailed understanding may be had from the following description, given by way of example in conjunction with the accompanying drawings, wherein.

DETAILED DESCRIPTION

Figure 1A:
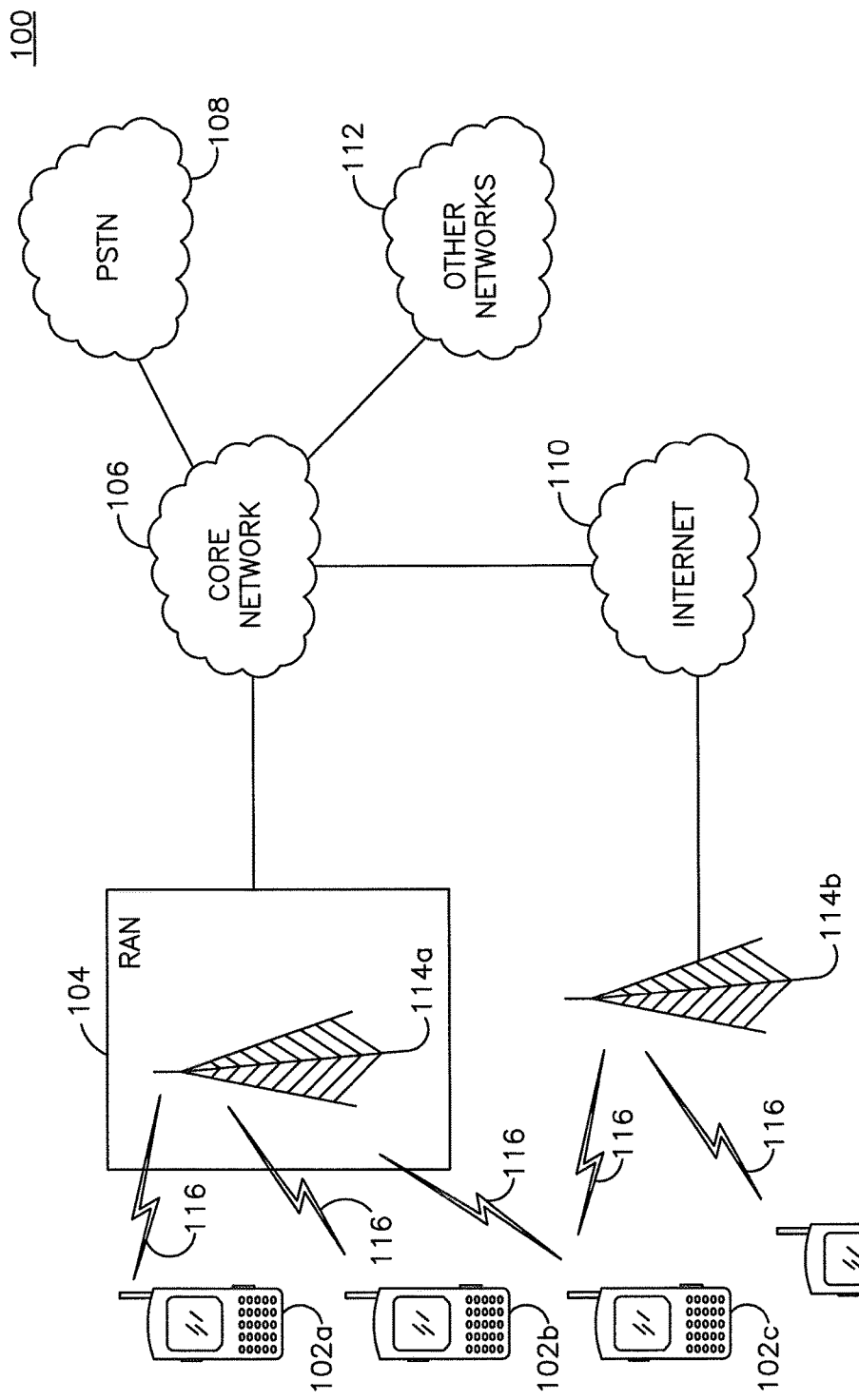
FIG. 1A is a diagram of an example communications system in which one or more disclosed embodiments may be implemented.

For optimum operations, changes may be required in a conventional WTRU receiver and additional knowledge regarding the transmission on the WTRU side may be needed. More specifically, for the case of soft combining, the WTRU may be able to properly estimate the effective propagation channel of the data to ensure optimum detection. This requires knowledge at the WTRU side of the relative power between the pilot channel and the data channel from each Node B.

In soft combining operations, the Node B scheduler may decide to not transmit during certain TTIs (e.g., based on a channel quality indicator (CQI)) to optimize system performance. In such cases, the WTRU receiver may be reconfigured or informed such that proper reception is guaranteed.

Mechanisms for multipoint HSDPA operations with fast assistive information from the Node B are described. When referred to hereafter, the term "multipoint HSDPA" may refer to multipoint operation in the same frequency or in different frequencies. To simplify the description, many of the methods are described in the context of two sources, but it should be understood that these concepts may be readily extended to multiple sources. While some embodiments are described in the context of dual cell multipoint HSDPA operation, these embodiments are equally applicable to multi-cell multipoint operation for downlink operation (HS-DPA) or uplink operation (high-speed uplink packet access, HSUPA). Additionally, some of these embodiments may also be applicable to multipoint Long-Term Evolution (LTE) operation, wherein the HS-DPSCH may be equivalent to the physical downlink shared channel (PDSCH) and the high-speed shared control channel (HS-SCCH) may be equivalent to the physical downlink control channel (PDCCH).

The following terminology is used herein:

"Serving high-speed downlink shared channel (HS-DSCH) cell," "primary cell," and "serving cell" are equivalent terms relating to the main HS-DSCH cell. The main HS-DSCH cell is determined by the network, and typically carries other control channels for that WTRU, such as an enhanced dedicated channel absolute grant channel (E-AGCH).

"Secondary serving HS-DSCH cell" and "secondary cell" are equivalent terms relating to at least one other HS-DSCH cell which also transmits data to the WTRU. The secondary serving HS-DSCH cell is assumed to transmit over the same frequency or a different frequency as the serving HS-DSCH cell. A secondary cell also may be referred to as a multipoint cell or a multipoint secondary cell.

A "serving HS-DSCH cell set" is the set of all HS-DSCH cells (including the serving cell and any secondary serving cells) which may transmit data to the WTRU, or equivalently for which the WTRU is configured to listen to for HS-DSCH reception. A serving HS-DSCH cell set also may be referred to a multipoint set.

A "primary HS-DSCH transmission" is a HS-DSCH transmission from the primary cell.

A "secondary HS-DSCH transmission" is a HS-DSCH transmission from a secondary serving HS-DSCH cell, and may or may not carry the same data as its associated primary HS-DSCH transmission.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
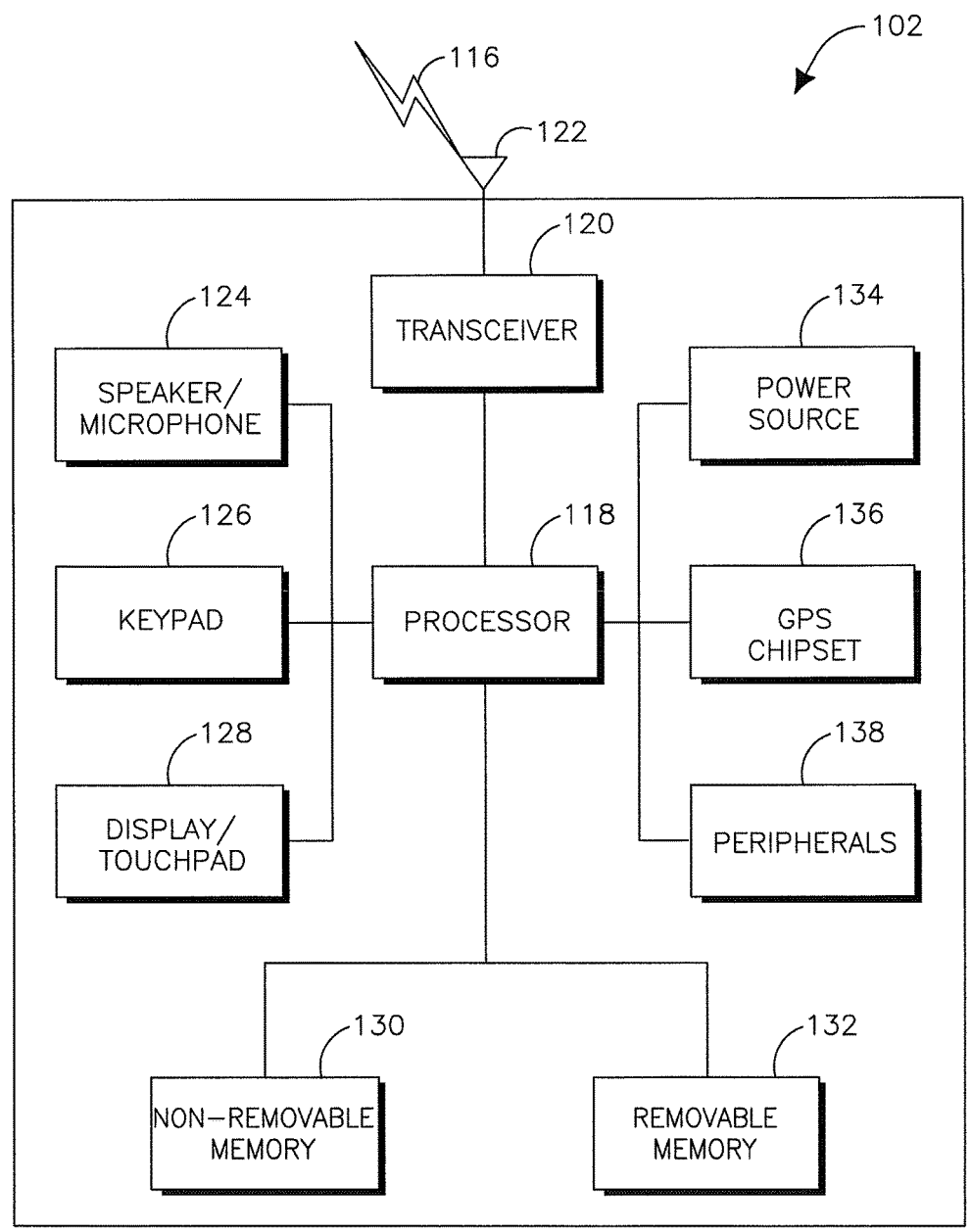
FIG. 1B is a diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
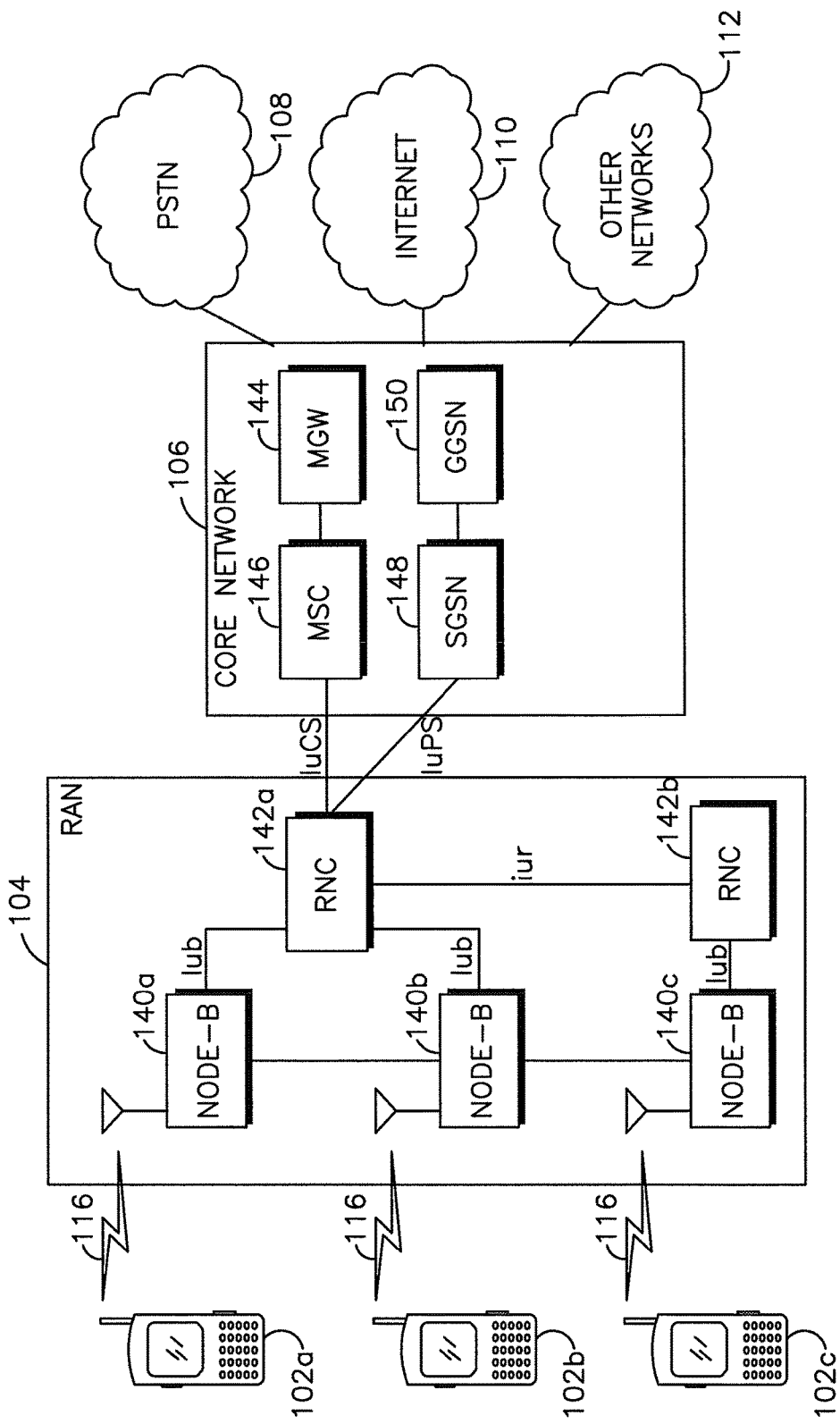
FIG. 1C is a diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Methods to schedule and receive transmissions over more than one HS-DSCH cell in one or more frequencies are described below. When multi-cell HS-DSCH reception is enabled, configured, and/or activated, the network needs to be able to address the WTRU and schedule the transmissions over the HS-DSCH cells. Methods to perform data transmissions belonging to one transport block over multiple cells include sending an identical signal over both cells, using a common coding block but different signals sent over two cells, splitting the transport block over two cells, and receiving and scheduling multipoint transmissions.

In sending an identical signal over all cells, the networks send the same data transport block to the WTRU over both the primary serving cell and the secondary serving cell (for example, as in dual cell operation). As illustrated in the overlapped area in FIG. 2, identical processing over HS-PDSCH data, such as channel coding, rate matching, redundant version (RV) selection, spreading, and scrambling, are conducted in all cells. As a result, identical signal waveforms (S) are transmitted at the antennas of each cell. These signals are combined in the air via different propagation paths. Because there is only one CRC attached to the transport block and both cells share the same RV for this mode of operation, the HARQ process may be maintained as if only one cell is transmitting.

Figure 2:
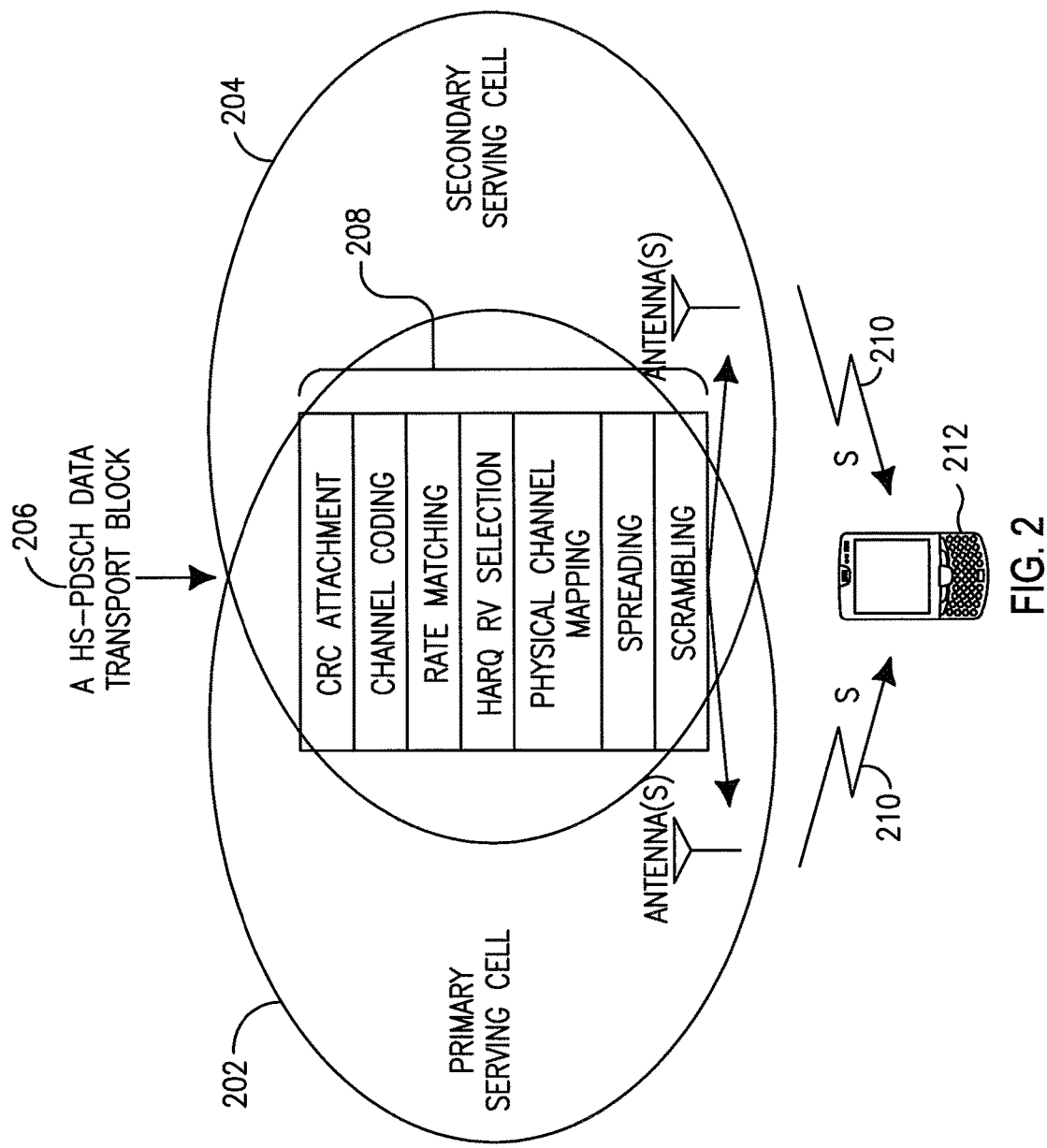
FIG. 2 is a diagram showing an operation mode of the identical signal being sent over both cells.

In FIG. 2, a primary serving cell 202 and a secondary serving cell 204 both receive a HS-PDSCH data transport block 206. Both cells 202 and 204 have the same set of processing functions (208) to generate signals S 210 for transmission to a WTRU 212.

In one method of scheduling the downlink HS-PDSCH transmission to address the WTRU for this operation mode, the network may use one HS-SCCH to schedule data transmissions over both cells, because the signal over both cells is the same. Alternatively, all cells transmit the same HS-SCCH signal using the same scrambling code to achieve cross-site diversity. Alternatively, different scrambling codes may be used for transmitting the HS-SCCH over both cells.

It may be desirable for the WTRU to be aware of the assistive transmission at a specific subframe, so that its receiver may be adjusted for optimizing the data reception. For instance, the WTRU may start performing channel estimation on the data path over the secondary serving cell and maximize the gain on its advanced receiver. The WTRU may be dynamically notified of the assistive transmission via the HS-SCCH control channel or other L1 channels.

In this operation mode, the WTRU may be further configured with MIMO or beamforming (BF). But the precoding weights used by the two cells may be different for an optimal design, due to propagation path differences. As such, two sets of precoding weight information (PWI) bits may be reported to the WTRU via the HS-SCCH. The HS-SCCH design required to support the operation mode of sending identical signals from two cells may be modified to include an indication of the assistive transmission on per TTI basis and/or a PWI report for the secondary serving cell.

Figure 3:
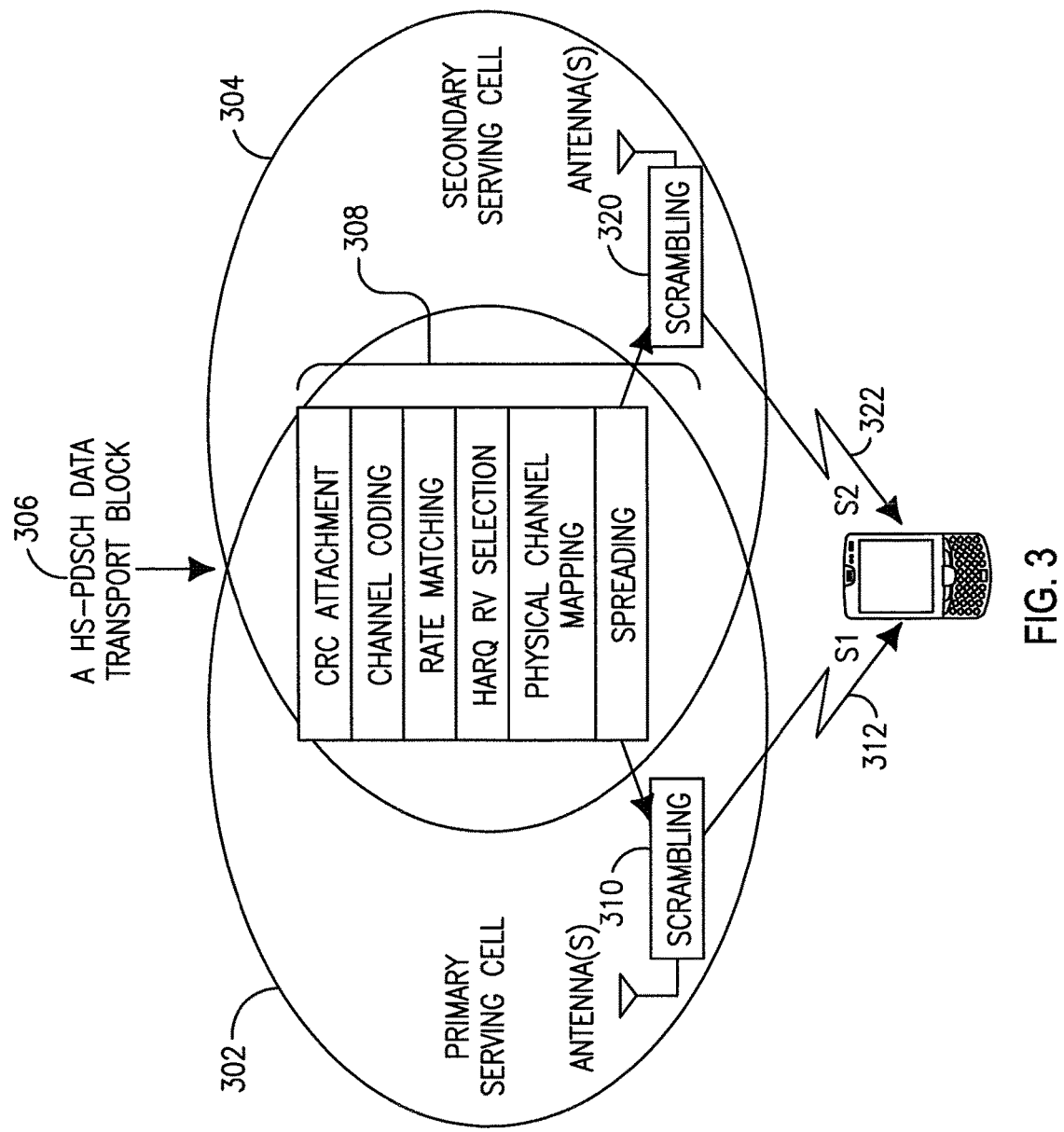
FIG. 3 is a diagram of using different scrambling codes over two cells.

As a small variation of this operation mode, the scrambling codes at the two cells may be different, as illustrated in FIG. 3. By using two different scrambling codes, two different signals (S1, S2) are generated. The WTRU may perform demodulation according to the associated scrambling codes and soft combining at any later processing stage whenever two signals are deemed similar.

In FIG. 3, a primary serving cell 302 and a secondary serving cell 304 both receive a HS-PDSCH data transport block 306. Both cells 302 and 304 similarly perform CRC attachment, channel coding, rate matching, HARQ RV selection, physical channel mapping, and spreading on the block (308). The primary serving cell 302 performs scrambling (310) to generate signal S1 312 for transmission to the WTRU 314. Similarly, the secondary serving cell 304 performs a different scrambling (320) to generate signal S2 322 for transmission to the WTRU 314.

This configuration may be applicable to the case where the WTRU is equipped with at least two antennas, so the two signals from the two cells may be effectively separated by the spatial difference of the two cells. To alleviate the separation problem, precoding weights may be applied across the transmit antenna of the two cells. In this way, the MIMO multiplexing gain may be achieved across the antennas of the two cells.

For a secondary serving cell involved in the assistive transmission, its pilot channel, denoted by CPICH, has to be transmitted with the scrambling code assigned to this cell by the network because it has to perform its primary task to serve other WTRUs who deem this cell as a primary serving cell. As the channel estimation is normally performed based on the CPICH, this restriction may require a WTRU receiver function to be modified to process dual scrambling codes, which may result in two disadvantages. First, the operation is not transparent to the single transmission mode, and the WTRU has to be informed of the assistive transmission mode on per TTI basis. Second, the legacy WTRUs that are not capable of the receiver function change may not be able to enjoy the benefit of the multiple point transmission.

As a solution, an additional CPICH may be transmitted over the secondary serving cell using the same scrambling code as the primary cell. The original CPICH(s) are still transmitted using the assigned scrambling code for this cell. As the spreading factor is high (256) for the CPICH and the WCDMA cellular system is designed to allow multiple coexisting scrambling codes, the interference created by adding the assistive pilot channel should be manageable. This solution is illustrated in FIG. 4.

Figure 4:
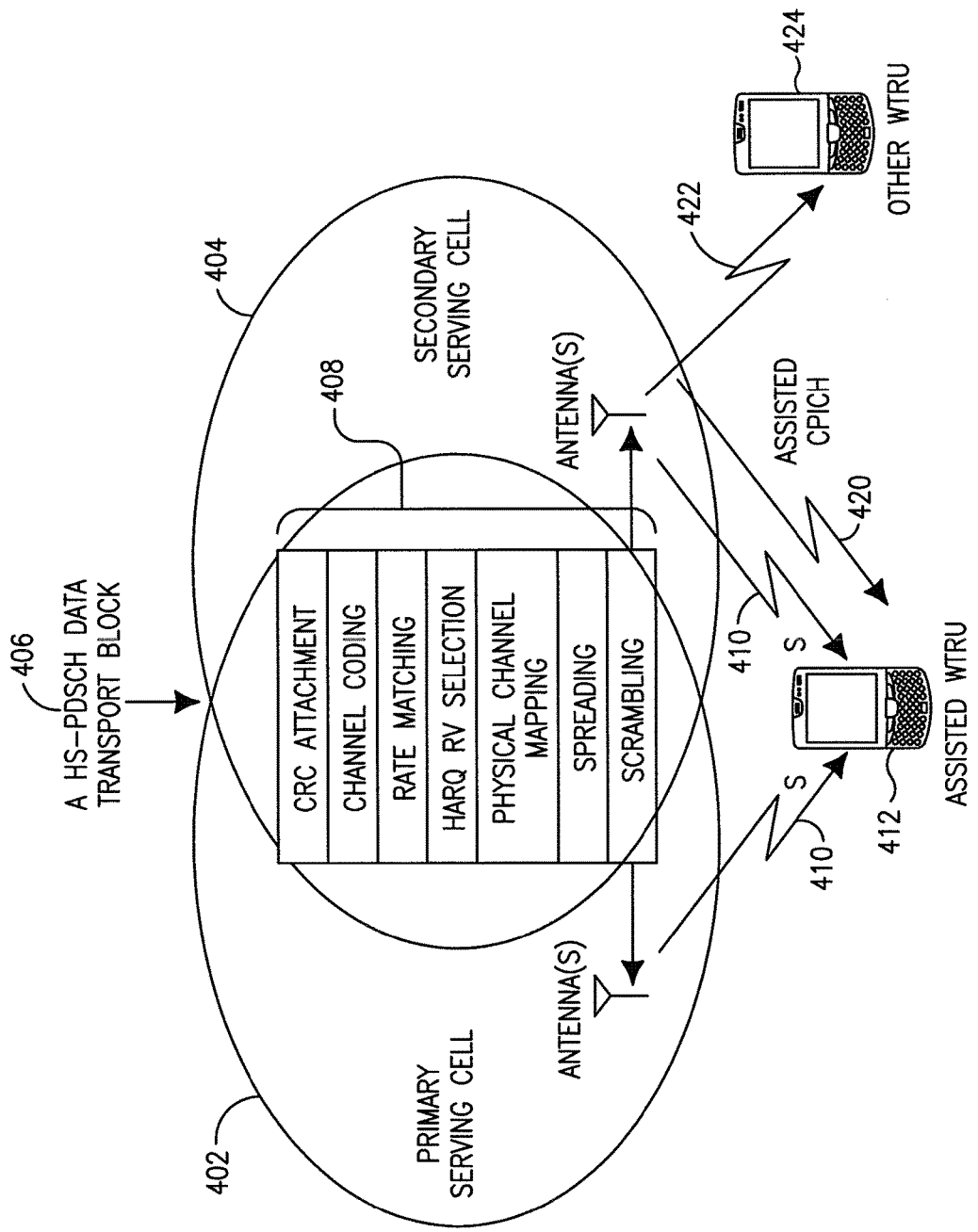
FIG. 4 is a diagram of using an assistive common pilot channel (CPICH)

In FIG. 4, a primary serving cell 402 and a secondary serving cell 404 both receive a HS-PDSCH data transport block 406. Both cells 402 and 404 similarly process the block (408) to generate signals S 410 for transmission to an assisted WTRU 412. The secondary serving cell 404 transmits an assistive CPICH signal 420 to the assisted WTRU 412, which is also treated as a CPICH signal 422 by another WTRU 424.

With the configuration shown in FIG. 4, the assistive transmission is transparent to all WTRUs, as the channel estimation may be effectively performed for both receive paths to the two cells by the conventional receiver structure. The signals from the secondary serving cell may be treated as additional multiple paths.

The design of the assistive CPICH may further include one or more of the following. The assistive CPICH may not be transmitted constantly, and may be transmitted only in the subframe where an assistive HS-PDSCH transmission is taking place. The same cross-cell precoding as for the HS-PDSCH may be applied to the assistive CPICH, to have a cross-cell beamforming effect to mitigate its interference to other WTRUs. The power of the assistive CPICH relative to other physical channels transmitted in the secondary serving cell may be dynamically variable, to maximize the MP gain and minimize the overhead.

When using a common coding block but sending different signals over two cells, the network sends the same information or the same transport block size to the WTRU over the two HS-DSCH cells. This may be performed by both cells using the same scrambling code or by both cells using different scrambling codes. The signals transmitted over the air may not be necessarily the same for the two cells, even though the same transport block of data is intended to be sent to the WTRU. This is because the secondary serving cell may choose a different portion of the encoded data (i.e., different redundant version (RV)) or a different modulation to transmit. An example of using different RVs is illustrated in FIG. 5.

Figure 5:
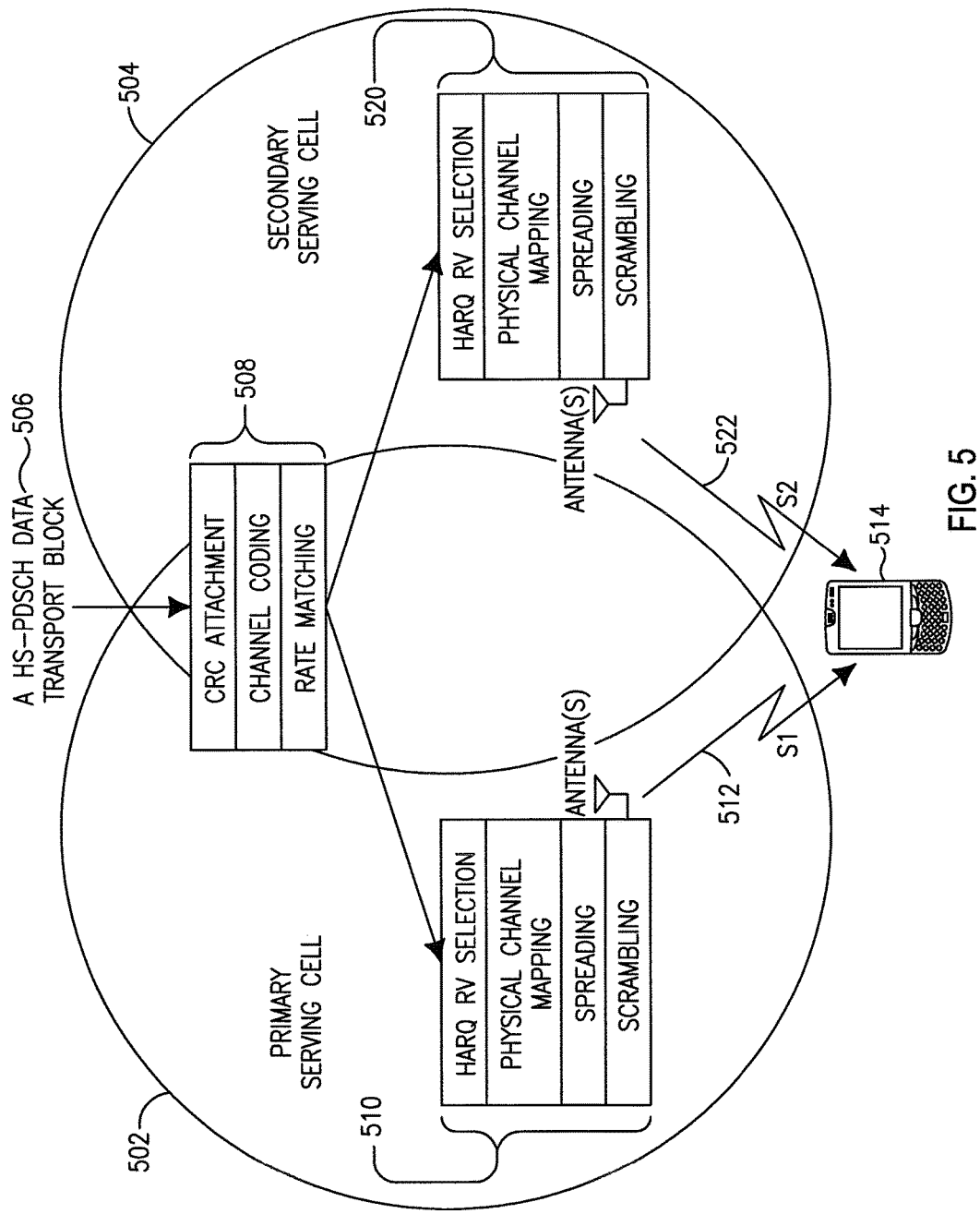
FIG. 5 is a diagram showing an operation mode of different redundant versions (RVs)

In FIG. 5, a primary serving cell 502 and a secondary serving cell 504 both receive a HS-PDSCH data transport block 506. Both cells 502 and 504 similarly perform CRC attachment, channel coding, and rate matching on the block (508). The primary serving cell 502 performs HARQ RV selection, physical channel mapping, spreading, and scrambling (510) to generate signal S1 512 for transmission to the WTRU 514. Similarly, the secondary serving cell 504 may perform different HARQ RV selection, physical channel mapping, spreading, and scrambling (520) to generate signal S2 522 for transmission to the WTRU 514.

The assistive transmission may not necessarily be transmitted in the same subframe with the primary transmission, as long as means of associating the data in the two transmissions is facilitated. For this operation mode, the two serving cells may not be required to operate in the same frequency. As the soft combining of the signals from the two cells may be performed at the symbol level at a later stage of receiver processing, the assistive transmission from the secondary serving cell may be configured with a different frequency band.

For soft combining at the HARQ level, each cell is required to indicate its RVs selection in HS-SCCH messages on a per-subframe basis. The network scheduler may have the flexibility to schedule multiple transmissions or retransmissions with the same RVs. At the WTRU, once data packets with the same RV are received, it may perform simple chase combining on one of those packets first and then combine it with the others at the HARQ level. Alternatively, a predetermined rule defining the relation of the two RVs is specified, and the selection of only one of the RVs is signaled in the HS-SCCH. Upon receiving the HS-SCCH, the WTRU determines the RV of the secondary cell by applying this rule. For example, the RV of the secondary cell may be equivalent to the RV of the primary cell plus an offset (e.g., +1) in a predefined table.

Figure 6:
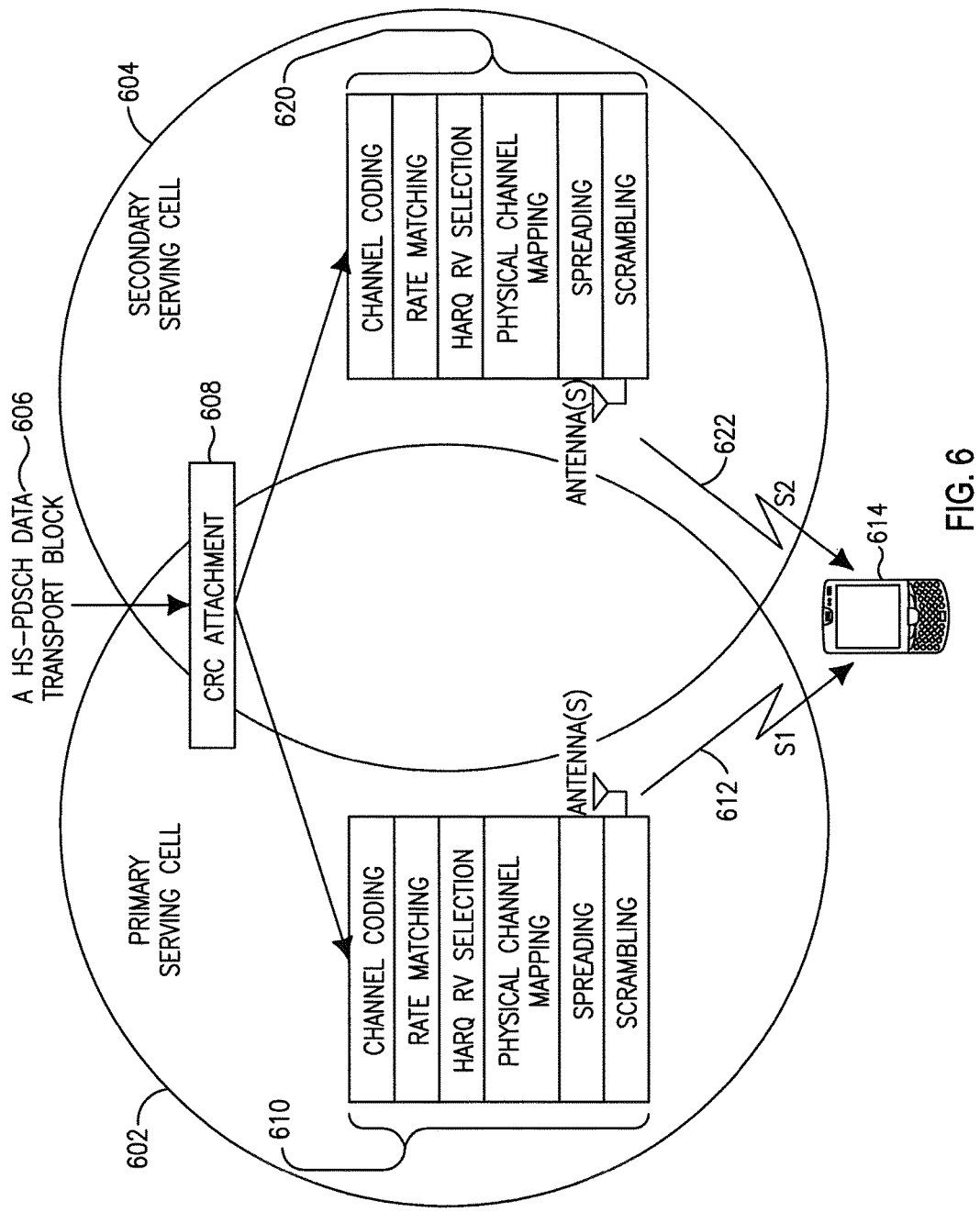
FIG. 6 is a diagram showing an operation mode of using a split transport block.

As shown in FIG. 6, splitting the transport block over two cells allows the data to be split after the CRC is attached to the transport block. A primary serving cell 602 and a secondary serving cell 604 both receive a HS-PDSCH data transport block 606. Both cells 602 and 604 similarly perform CRC attachment on the block (608). The primary serving cell 602 performs channel coding, rate matching, HARQ RV selection, physical channel mapping, spreading, and scrambling (610) to generate signal S1 612 for transmission to the WTRU 614. Similarly, the secondary serving cell 604 performs channel coding, rate matching, HARQ RV selection, physical channel mapping, spreading, and scrambling (620) to generate signal S2 622 for transmission to the WTRU 614. The transmit processing functions (channel coding, rate matching, HARQ RV selection, physical channel mapping, spreading, and scrambling) on the two cells 602, 604 may be made independently, which means that the coding rates, modulation, scrambling, etc., may be different or the same across the cells.

The transport block may be split proportionally according to the CQIs reported from the WTRU related to the propagation paths for both cells. In one example implementation, let TB1 be the preferred transport block size indicated by the CQI and other scheduling decisions for the primary serving cell, and TB2 be the preferred TB size for the secondary serving cell. The total transport block size then is determined by TB=TB1+TB2. The data of size equal to TB1 will be processed by the primary serving cell and transmitted to the WTRU. The rest of the data is left to the secondary serving cell for transmission. Alternatively, an equal splitting scheme may be adopted that allows the two cells to transmit equal amounts of data or a predetermined rule may be used to determine how to split the data.

In an alternate method, the data may be split into different layers across transmission points after modulation has been performed. More specifically, the modulated signal may be split according to a predetermined rule across the transmission points.

How the data is to be split may be explicitly indicated to the WTRU via HS-SCCH signaling. More specifically, separate transport block sizes or a separate number of bits to indicate the size may be signaled to the WTRU. The WTRU then decodes the HS-DPSCH accordingly. Alternatively, the WTRU receives all the information from one HS-SCCH (e.g., the primary) and uses a predetermined rule to determine the number of bits transmitted over each cell. The WTRU may be configured semi-statically with this transmission scheme or dynamically, wherein it is explicitly indicated whether the TB has been split or not according to any of the pre-determined rules. Upon receiving this indication, the WTRU may independently decode the data from each point or cell and combine the data.

As only one CRC is attached to the joint transport block, the WTRU may acknowledge the entire transport block as a whole. Therefore, only one HARQ function is needed, even though two cells are involved in the transmission. Once the NACK is sent to the network, both cells resend the data simultaneously in the HARQ retransmission.

To signal the split transmission from the two cells, the existing HS-SCCH message may be reused simultaneously on each cell. The difference is that the transport block size indicated in the message is the data block size after the splitting, rather than for the whole transport block. The same or different scrambling codes may be used for the transmission of data this way, and different weights may be applied to each cell transmission.

Methods to perform reception and scheduling of multipoint transmissions are described below. The transmission mode or reception mode may be semi-statically configured in the WTRU via RRC signaling or, alternatively, a more dynamic transmission mode may be performed. This may allow the WTRU to receive data according to any of several different transmission schemes over multiple points.

In one method to schedule the WTRU, the network may use one HS-SCCH to schedule the data transmissions over both cells. This HS-SCCH may be transmitted on the serving HS-DSCH cell or on a secondary cell. For this solution, the WTRU only monitors the HS-SCCH code set of the primary HS-DSCH cell. When the WTRU detects a HS-SCCH dedicated for that WTRU and is aware that data is scheduled over both cells, according to any of the solutions described herein, the WTRU may start receiving the HS-PDSCH(s) on both cells according to the information received in the HS-SCCH. Alternatively, even though only one HS-SCCH is used to indicate transmission over two cells, this HS-SCCH may be sent over the primary HS-SCCH or the secondary HS-SCCH.

Depending on the multipoint transmission scheme, the HS-SCCH type may be modified to include additional information to allow the WTRU to successfully decode the data. More specifically, a new HS-SCCH design may be introduced to signal the additional information required to fully decode the data on the secondary serving cell. This new HS-SCCH design may require a change of the rate matching algorithm for HS-SCCH. The WTRU may be configured to decode this type of HS-SCCH based on a semi-static configuration.

Alternatively, even though only one HS-SCCH is used to schedule the WTRU, the same HS-SCCH may be sent across all transmission points (e.g., identical in signal wave form) to achieve cross-site diversity for enhancing the reliability of the HS-SCCH transmission at the cell edge. Alternatively, the same HS-SCCH may be repeated over all transmission points, but a different scrambling code used for each HS-SCCH.

In a second method, two HS-SCCHs are used to schedule a transmission over two cells. Depending on the transmission scheme, the HS-SCCH may contain the same information and the WTRU knows that an assistive transmission is taking place over both cells and performs combining at the physical layer. Alternatively, the HS-SCCH may contain a subset of similar information and a subset of different information. More specifically, the HS-SCCH of each cell may contain the necessary information required to decode data individually on each cell, so if certain information, such as but not limited to, PWI, RV, modulation, etc. are different, then some of the signaled information may be different. But the same HS-SCCH type (e.g., Type 3 or Type 1) is signaled over both cells.

In a third method, the HS-PDSCH sent over the two cells may not necessarily contain the same information. More specifically, even though the same transport block is being transmitted, the network may use, for instance, a different RV or a different modulation format for the data transmitted over the two cells, or different precoding weight information, possibly with the same or different scrambling codes. The WTRU may then independently decode the two streams of data and perform soft combining at the HARQ level or at the physical layer. To provide this information to the WTRU, the same type of HS-SCCH is used to signal the information required to receive the HS-DPSCH on each cell.

Alternatively, one HS-SCCH may be used to schedule the transmission of this type of data over both cells and the HS-SCCH may be sent over the primary cell. This may require a new HS-SCCH type, wherein new information fields are added to the information bits required for single cell transmission. This may include the information that may be different in the secondary cell. For example, if the RV is allowed to be different, the HS-SCCH may include the RV field of the secondary cell. Similarly, if a different modulation scheme is used, a secondary cell modulation information field may be added to the HS-SCCH.

In another alternative, two different HS-SCCH types may be sent over the primary HS-DSCH cell and the secondary HS-DSCH cell. The HS-SCCH carrying the general information required to decode the HS-DPSCH is sent over the primary cell. This may include the information that is common to the HS-DPSCH transmission on both cells, and the set of information that may be unique on the primary cell. The set of common HS-DPSCH information may include, but is not limited to: transport block size, HARQ process information, channelization code set, and modulation scheme (if it is not allowed to be changed). The information that may be unique to the transmission of the data on the primary HS-DSCH cell may include, but is not limited to: WTRU identity, RV, modulation scheme, and PWI.

It is understood that the above information is used as an example and shows a list of information from HS-SCCH type 1; however, it is also applicable to cases where MIMO is used, e.g., with HS-SCCH type 3. More specifically, an existing HS-SCCH type may be used to signal this information to the WTRU over the primary cell and a new HS-SCCH type may be transmitted over the multipoint cells.

The HS-SCCH on the secondary cell may provide the set of information that differentiates the coding of the two transmissions on the primary HS-DSCH and the secondary HS-DSCH. More specifically, it may include only a subset of the information needed to decode the data on the HS-DPSCH. The additional information required to decode the data in the secondary cell for any of the methods described above (e.g., one HS-SCCH type transmitted over both cells or two HS-SCCH types transmitted over different cells), may refer to at least one or a combination of the following: the RV used in the secondary cell; the modulation scheme used in the secondary cell; the WTRU identity used in the secondary cell; the pre-coding weight information, including two additional bits that may be added for the secondary serving cell PWI; the channelization code set, e.g., if the network schedules the WTRU over different HS-DPSCH codes than the primary HS-DPSCH; or the power offset.

For example, if the network is allowed to use a different RV, it may use the secondary HS-SCCH to signal the different RV that the data on the secondary HS-DSCH is using. The WTRU identity in the secondary cell, e.g., the HS-DSCH radio network temporary identifier (H-RNTI), may be the same as the one used in the primary cell or a different identity may be assigned to the WTRU. In the case where only one HS-SCCH is used, then a WTRU identity for the secondary cell is not required as additional information.

If the assistive transmission is allowed to be transmitted at a different subframe from the data transmission from the primary serving cell, the additional information may include an offset to the subframe where the associated data from the primary serving cell was sent. Alternatively, this may be signaled by providing the associated HARQ process ID in which the data from the primary cell was transmitted. More specifically, for this scheme the new HS-SCCH type sent over the secondary cell may contain a HARQ process ID.

To signal this information, a new HS-SCCH type may be used for the secondary HS-DSCH cell that only contains this subset of the information. The WTRU may use the general information of the primary HS-SCCH to determine the other parameters required to decode the HS-DPSCH.

Transmission methods for different data blocks over multiple cells are described below. In another operation mode, the network may send different data over both cells, but the data is not transmitted simultaneously. The two cells may or may not be operating in the same frequency for this mode. The WTRU may be scheduled over the primary HS-DSCH cell, with an indication over which cell the HS-DPSCH data is being transmitted. This scheduling may be performed dynamically on a per-TTI basis. One or a combination of the following methods may be used to signal the cell which the network uses to transmit HS-DPSCH: modify the HS-SCCH to include the cell ID, configure the WTRU with two H-RNTIs, the HS-SCCH code used, or the HARQ process used.

The HS-SCCH may be modified to include a cell ID, which indicates the cell over which the corresponding HS-DPSCH is being transmitted. For example, if the bit is set to zero, the transmission is over the primary cell; otherwise, it is transmitted over the secondary cell. Alternatively, if more than one secondary HS-DSCH cell is configured in the same frequency, more bits may be added to the HS-SCCH to provide the cell number.

The WTRU may be configured with two H-RNTIs, e.g., a primary and a secondary. The network uses the primary H-RNTI for all primary HS-DPSCH transmissions and the secondary H-RNTI for all secondary HS-DPSCH transmissions.

When identifying the HARQ process used, for example, a subset of HARQ processes is used only for transmissions on the primary cell and another subset is used for transmissions on the secondary cell.

The WTRU is provided with the HS-SCCH code set information to monitor on the primary cell and the secondary cell; however, it only monitors one HS-SCCH set at a given time. More specifically, the network may semi-dynamically indicate to the WTRU to switch the cell it monitors via Layer 1 or Layer 2 signaling.

In one implementation, a new Layer 1 message may order the WTRU to change the HS-DSCH cell it is currently monitoring. The Layer 1 message may correspond to a new HS-SCCH order. This may be performed by introducing a new order type, for example: Order type $x_{odt,1}$, $x_{odt,2}$, $x_{odt,3}$='010'. The order bits may then be set such that they indicate the HS-DSCH cell that may be active or that the WTRU may start monitoring, for example:

Reserved: $x_{ord,1}$, $x_{ord,2}$=$x_{res,1}$, $x_{res,2}$
HS-DSCH cell to monitor $x_{ord,3}$=$x_{hs-dsch,1}$ If $x_{hs-dsch,1}$='0,' the WTRU monitors the HS-SCCH of the primary cell. If $x_{hs-dsch,1}$='1'; the WTRU monitors the HS-SCCH of the secondary cell. The other order bits may be reserved for future use, or for use of other secondary cells. For example, if more than two HS-DSCH cells in a single frequency are configured, the $x_{ord,2}$ bit may be used in a similar way as $x_{ord,3}$.

Alternatively, an existing order may be used, such as the order used for DC-HSDPA. More specifically, the bit used to activate or deactivate a secondary cell in a different frequency may be used to indicate to the WTRU to switch HS-DSCH cells. More specifically, if the order indicates to activate the secondary cell (and if configured with multipoint operation), the WTRU switches HS-SCCH reception to the secondary cell on the same frequency. When the order is given to deactivate the secondary cell, the WTRU falls back to perform HS-SCCH reception on the primary HS-DSCH cell. When the WTRU receives the order, it may retune its receiver to the indicated cell and start monitoring the HS-SCCH of that new cell X TTIs upon receiving the order, where X is a predefined value.

In a second implementation, a medium access control (MAC) control protocol data unit (PDU) may be used to indicate to the WTRU the HS-DSCH cell it should be monitoring, e.g., a cell number. The MAC control PDU may indicate an activation time and the WTRU may start monitoring the new cell upon successful reception of the packet or X TTIs after successful reception of the packet.

Alternatively, the WTRU is configured to monitor the HS-SCCH of both cells simultaneously, but may only receive HS-DPSCH data over one cell at a time. In particular, the same H-RNTI that specifies the WTRU ID is applied to the HS-SCCH messages from both cells. If the WTRU receives a HS-SCCH that is addressed to it from one of the cells, it starts to demodulate the corresponding HS-PDSCH data from this cell.

Figure 7:
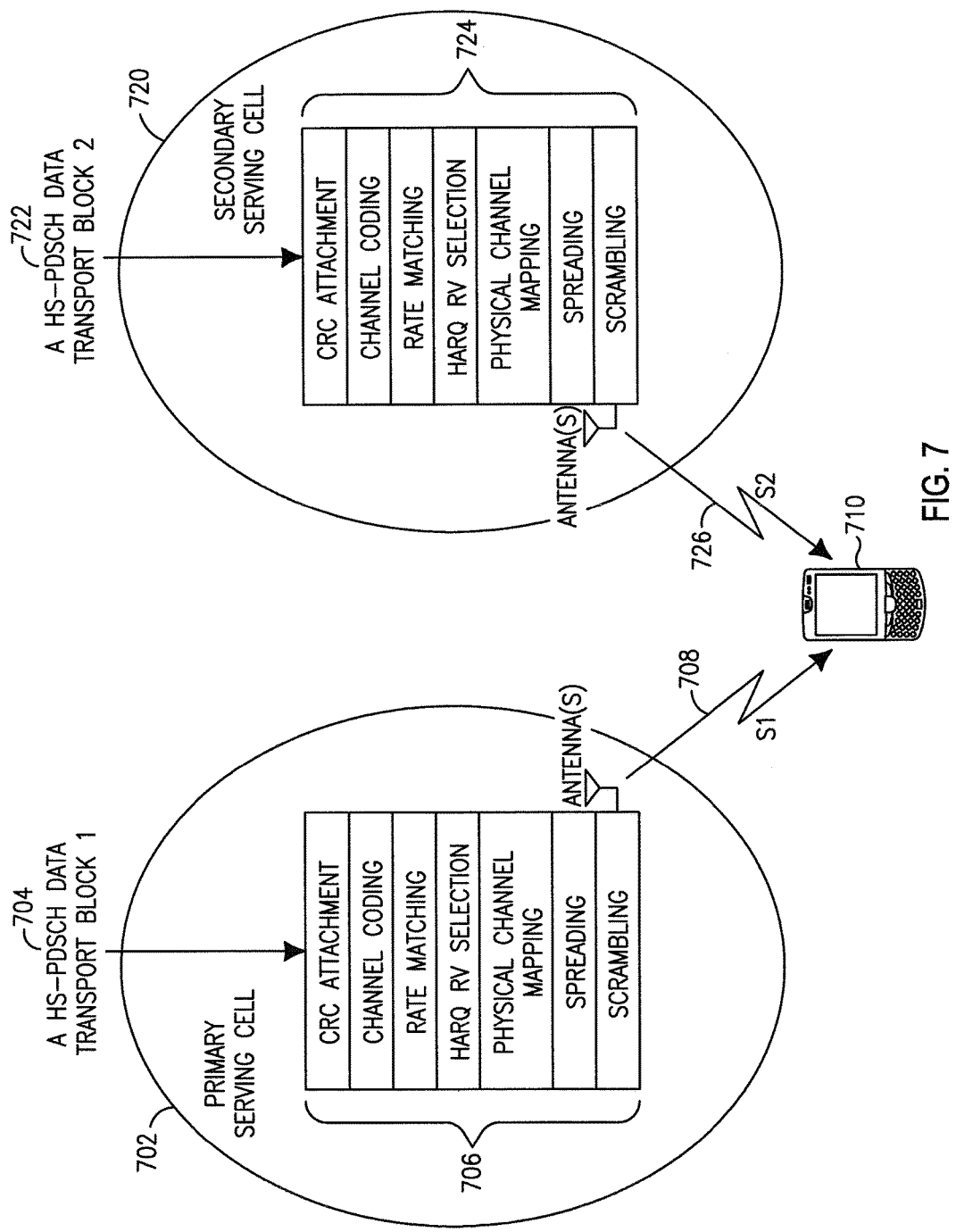
FIG. 7 is a diagram showing an operation mode of using different transport blocks.

In an alternate mode of HS-DSCH operation in a single frequency, different transport blocks may be sent over the two HS-DSCH cells, potentially simultaneously over both cells, which may be or may not be operating in the same frequency. In FIG. 7, a primary serving cell 702 receives a first HS-PDSCH data transport block 704. The primary serving cell 702 processes the block (706) to generate a signal S1 708 for transmission to a WTRU 710. A secondary serving cell 720 receives a second HS-PDSCH data transport block 722. The secondary serving cell 720 processes the block (724) to generate a signal S2 726 for transmission to the WTRU 710.

The WTRU may be addressed by using two independent HS-SCCHs over two cells. More specifically, the WTRU may be configured to monitor an HS-SCCH code set for each activated cell. If the WTRU detects its H-RNTI over any of the cells, it decodes the corresponding HS-PDSCH on that cell. With this way of addressing the WRTU, it may be possible to dynamically alternate to the switching-based operation mode described above. If only one HS-SCCH message is received from one of the cells, it only decodes the HS-PDSCH from that cell. The other cell may be considered as not transmitting.

In an alternate method, to avoid the WTRU monitoring the HS-SCCH(s) from both cells, cross-cell scheduling may be used. In one example of cross-cell scheduling, one HS-SCCH may carry the information for both cells, e.g., all the information required for both HS-DSCH cells is transmitted on one HS-SCCH, which may be scheduled on the primary HS-DSCH cell. This may be by a new HS-SCCH type (e.g., type 4) or by existing HS-SCCH type 3.

Dynamic scheduling among different transmission modes is described below. As described above, the WTRU may operate with a variety of transmission modes in a multipoint operation. In practical deployment, some of the operation modes may be advantageous in some channel conditions, while other operation modes may be better in other scenarios. For example, at a low SNR condition, the joint transmission of the same information from both cells may offer the best gain. While at a high SNR, simultaneous transmission of different information on each cell to the same WTRU may be more beneficial. A HS-SCCH design that allows a dynamic and seamless switching among various operation modes may permit maximizing the performance gain provided by the multiple cell transmission.

When the assistive transmission is taking place at a specific subframe, most likely all the data resources of the secondary serving cell would be made available to the assistive transmission using the either the same scrambling code or a different scrambling code as the primary cell. Otherwise, sending data simultaneously to other WTRUs via different channelization codes would generate unnecessary interference and degrade the benefit of the assistive transmission.

Under this assumption, the channel codes used for the HS-PDSCH in both the primary cell and the secondary cell may be the same, or different in a pre-defined manner. Thus, the field indicating the channelization codes used for data transmission in the HS-SCCH transmitted from one of the cells may be made available for the desired signaling purposes.

In one solution of allowing dynamic switching among different operation modes, two HS-SCCHs are transmitted with different scrambling codes associated with each cell originally configured by RRC, so that they may be demodulated correctly at the WTRU. To use the same scrambling codes for the HS-SCCHs for both cells, the WTRU has to be equipped with at least two antennas to rely on sufficient spatial diversity to distinguish the two HS-SCCHs at the WTRU. Both HS-SCCHs may be addressed to the same WTRU by applying the same or different H-RNTI. If the WTRU detects an HS-SCCH addressed to the WTRU from the secondary HS-DSCH cell, the WTRU then determines that a multipoint transmission is taking place and starts receiving the corresponding HS-PDSCH on both HS-DSCH cells.

In a first method, the network may determine dynamically, without reconfiguration, one of the operation modes for data transmission. To inform the WTRU about the operation mode, the full channelization indication field in the HS-SCCH sent by the secondary serving cell may be re-used to indicate the operation mode. More specifically, the channelization code set information bits, denoted by $x_{ccs,1}, x_{ccs,2}, \ldots, x_{ccs,7}$, in the secondary HS-SCCH may be re-defined for signaling different operation modes. An example is given in Table 1, which uses two bits in the field.

TABLE 1

Example of signaling the operation modes

| $x_{ccs,1}$ | $x_{ccs,2}$ | Mode of operation |
| --- | --- | --- |
| 0 | 0 | Simultaneous transmission of same signal over both cells |
| 0 | 1 | Simultaneous transmission of the same transport block over both cells, but with different RVs |
| 1 | 0 | Transmission of different transport blocks over both cells |
| 1 | 1 | Reserved |

Other fields in the secondary HS-SCCH may be maintained with the same usage. For example, transport block size information may still be used for its original purpose to indicate the transport block size for the secondary HS-PDSCH.

If the assistive transmission is transmitted at a different subframe from the primary data transmission, the additional bits in the field may be used as shown in Table 2, for example, to indicate an offset to the subframe where the data from the primary serving cell is sent, or a HARQ process ID may be specified.

TABLE 2

Example of signaling the subframe offset

| $x_{ccs,6}$ | $x_{ccs,7}$ | Subframe |
| --- | --- | --- |
| 0 | 0 | Assistive transmission takes place in the same subframe as the primary transmission |
| 0 | 1 | Assistive transmission takes place one subframe after the primary transmission |
| 1 | 0 | Assistive transmission takes place two subframes after the primary transmission |
| 1 | 1 | Assistive transmission takes place three subframes after the primary transmission |

Switching the operation modes may be made on a per-TTI basis, as the operation mode may be updated every TTI as long as the HS-SCCH is transmitted.

In a second method, the channelization code set information bits are partially used for signaling the multipoint transmission. The network still may indicate different channelization codes for the assistive transmission. Let 0 represent the starting code and P the number of codes used for the data transmission; only 0 may be required to be the same for both cells. The secondary serving cell may indicate a different number of channelization codes used for the assistive data transmission. Therefore, different transport block sizes may be scheduled over the secondary serving cell. In particular, the bits from the channelization code set information field may be used as follows for the secondary serving cell.

For the first three bits (code group indicator) of which $x_{ccs,1}$ is the most significant bit (MSB):

$$x_{ccs1}, x_{ccs2}, x_{ccs3} = \min(P-1, 15-P)$$

then the fourth bit is defined by $$x_{ccs4} = \lfloor P/8 \rfloor$$

Optionally, for the first four bits (code group indicator) of which $x_{ccs,1}$ is the MSB:

$$x_{ccs,1}, x_{ccs,2}, x_{ccs,3}, x_{ccs,4} = P-1$$

The rest of the bits in the channelization code set information field may be used to signal the operation mode, or optionally, the subframe offset if the assistive data is transmitted in a different subframe as the primary cell. An example of such use is illustrated in Table 3 in conjunction with Table 2, where one bit is used to indicate the operation modes and two bits are used to signal the subframe offset.

TABLE 3

Example of signaling the subframe offset of second method

| $x_{ccs,5}$ | Mode of operation |
| --- | --- |
| 0 | Simultaneous transmission of transport blocks over both cells |
| 1 | Transmission of different transport blocks over both cells |

In the operation mode indicated by $x_{ccs,5}=0$, different RVs may still be used in the assistive transmission for the secondary serving cell, which may be signaled in the redundancy and constellation version field carrier on the HS-SCCH from the secondary serving cell.

The operation mode to be used on a particular subframe for the assistive transmission may be left to network to decide. Triggering criteria for switching may be applied individually or in any combination of the following: based on the range of CQIs reported by the WTRU; based on the path loss reported by the WTRU; based on the handover status or measurements reported by the WTRU; or based on the scheduling loads of both primary and secondary serving cells.

Methods to inform the WTRU of the presence of secondary transmissions are described below. To maximize the use of the network resources, the network may use soft combining operations only when judged necessary (e.g., based on CQI feedback from WTRUs). The following methods may be used individually or in any combination. In addition, these methods also may be used to activate or deactivate dual cell in single frequency operation even for schemes that do not require soft combining.

Fast activation/deactivation mechanisms may be used, in which the WTRU is informed on a semi-static basis of the presence of secondary transmissions. This may be achieved, for example, via the activation/deactivation mechanisms offered by the HS-SCCH orders. These transmissions may or may not carry the same data.

In a first method, the WTRU is configured to receive secondary transmissions, or equivalently the secondary cell is said to be enabled. This configuration is carried out using L3 configuration messages, e.g., via RRC signaling. The Node B may then deactivate and re-activate the secondary cell using the existing or new HS-SCCH orders.

To support the activation and deactivation of secondary serving HS-DSCH cells from other Node Bs than the serving HS-DSCH cell, additional rules for activation/deactivation via HS-SCCH orders may be required. To allow more flexibility at each Node B scheduler, each Node B may decide the activation/deactivation status for the secondary cells it controls. To allow such control, the WTRU may deactivate a secondary serving HS-DSCH cell only when it receives the deactivation order from that cell, or the WTRU may activate a secondary serving HS-DSCH cell only when it receives the activation order from that cell.

Alternatively, a centralized control may be desired for a network implementation. In such cases, the WTRU may deactivate a secondary serving HS-DSCH cell only when it receives the deactivation order from the primary cell, or the WTRU may activate a secondary serving HS-DSCH cell only when it receives the activation order from the primary cell.

Alternatively, the order to activate or deactivate may be received from any of the HS-DSCH cells where the WTRU is continuously monitoring the HS-SCCH code set.

Alternatively, the activation order for a secondary HS-DSCH cell on the same frequency may only be sent by the Node B or received by the WTRU from a HS-DSCH cell on that same frequency.

In the context of multi-frequency and multipoint downlink operations, the WTRU may be configured with two cells, for example, on adjacent frequencies or on different bands or frequencies. Each of those cells may have associated secondary (multipoint) cells on that frequency. A primary frequency and a secondary frequency are defined, and there is one serving HS-DSCH cell per frequency.

The "primary frequency serving HS-DSCH cell" (also referred to as the "primary cell") is the primary cell on the primary frequency. The "secondary frequency serving HS-DSCH cell" (also referred to as the "secondary frequency primary cell") is the primary cell on the secondary frequency and may correspond to the same Node B or sector as the primary frequency serving HS-DSCH cell. The "primary frequency secondary serving HS-DSCH cell" (also referred to as the "primary frequency secondary cell") is the secondary cell associated to the primary frequency. The "secondary frequency secondary serving HS-DSCH cell" (also referred to as the "secondary frequency secondary serving cell") is the secondary cell associated to the secondary frequency.

It is understood that if multipoint transmissions are possible over different frequencies, then a secondary serving cell may correspond to the multipoint cell in the second frequency (e.g., the non-primary frequency). In such configurations, additional restrictions on the activation and deactivation mechanisms may be implemented. For example, when the secondary frequency serving HS-DSCH cell is deactivated, the secondary frequency secondary serving HS-DSCH cell is also deactivated.

When a dual cell dual carrier and dual cell single frequency configuration is activated, the WTRU and the network may use the existing HS-SCCH orders used for 4C-HSDPA to control the activation or deactivation of the secondary HS-DSCH cells. This may be achieved by providing a mapping or an order for the cells to activate or deactivate. The order of the cells to activate or deactivate may follow a predefined rule or a configuration order. For example, the numbering may start with the primary frequency secondary HS-DSCH cell. In this example, the numbering may be as follows: the first secondary HS-DSCH cell is the secondary cell (or multipoint cell) on the primary frequency, the second secondary HS-DSCH cell is the secondary frequency serving HS-DSCH cell (if configured), and the third secondary HS-DSCH cell is the secondary frequency secondary serving HS-DSCH cell (if configured).

In another example, the numbering may start with the secondary frequency serving HS-DSCH cell, such as: the first secondary HS-DSCH cell is the secondary frequency serving HS-DSCH cell (if configured), the second secondary HS-DSCH cell is the primary frequency secondary serving HS-DSCH cell (if configured), and the third secondary HS-DSCH cell is the secondary frequency secondary serving HS-DSCH cell (if configured). In both of these examples, it is understood that if one of the cells is not configured, the numbering may change according to the order of the configurations that are present.

When the secondary cell is located in a different Node B than the primary cell, an additional delay due to the Iub/Iur interface overhead may be required for activation and deactivation. In such cases, a different activation/deactivation delay may be prescribed. Optionally, the WTRU may receive the activation/deactivation delay from the network via the higher layers (e.g., RRC signaling), and the delay for activation and deactivation may be different. In a configuration where the cells are not located in the same Node B or there is no communication between the sectors of a Node B, when a decision to activate or deactivate a cell is taken, the cell taking the decision may notify the other Node B, the other cells, or the RNC.

The decision to activate or deactivate a secondary HS-DSCH cell may be taken by the primary HS-DSCH serving cell or a secondary HS-DSCH serving cell. Even though the decision may be taken by one Node B, the order to activate or deactivate may be given by the other Node B. Additionally, once a decision to activate or deactivate is made, the RNC may also be informed to properly direct the data to the Node Bs.

If the primary Node B takes the decision to activate or deactivate the cell in a secondary Node B, the primary HS-DSCH cell sends an activation/deactivation order to the WTRU to activate or deactivate the corresponding secondary HS-DSCH serving cell. The Node B then informs the other Node B and/or RNC (serving and/or controlling) via Iub/Iur signaling of the HS-DSCH serving cells that have been activated or deactivated. Alternatively, the Node B only informs the secondary HS-DSCH serving cell and/or the RNC of the activation/deactivation when an acknowledgement (ACK) to the order is received.

Alternatively, the primary HS-DSCH cell first notifies the other Node B and/or RNC of the decision to activate or deactivate the secondary HS-DSCH cell using Iub/Iur signaling. To ensure proper synchronization between the Node Bs and the WTRU, the serving Node B may optionally indicate a time stamp or activation time of the time that the serving primary cell is expecting or wants the secondary HS-DSCH cell to be activated or deactivated. At the activation time, the primary HS-DSCH cell or the secondary HS-DSCH cell (dependent on which cell can send the order) sends the activation/deactivation order to the WTRU.

Alternatively, the primary HS-DSCH cell notifies the other Node B and/or the RNC of the decision. The actual order or signaling to activate or deactivate the corresponding HS-DSCH cell is sent only if the other Node B approves the decision. The approval may be sent to the primary cell and/or the RNC via Iub/Iur signaling. The approval may be in the form of a single bit, indicating yes or no, or alternatively the approval may provide an activation time to the primary cell and/or the RNC indicating the time at which it will allow activation (or deactivation) of the secondary HS-DSCH cell. If approved, at the given activation time, the primary carrier and/or the secondary carrier may signal to the WTRU to activate or deactivate the cell. The activation time may correspond to a predefined time after the transmission of these messages, to the activation time initially signaled by the primary carrier, or to the activation time signaled to the primary carrier by the secondary carrier.

Similarly, if the secondary cell takes a decision to activate or deactivate itself, it may send an order to the WTRU and then notify the primary Node B and/or the RNC, or only notify the primary Node B and/or the RNC when an ACK is received. Alternatively, the secondary cell may notify the primary cell and other secondary cell(s) and/or the RNC, if applicable, and proceed using similar actions to the ones described for the primary HS-DSCH cell taking the decisions.

If the decision is to activate the secondary HS-DSCH cell and the WTRU is not receiving HS-DSCH data from the secondary cell, the secondary Node B has to notify the primary Node B to send the activation order. The secondary cell may also notify the RNC and the RNC may optionally notify the primary Node B. Similarly, the secondary cell may send an activation time to the primary Node B and/or the RNC. At the given activation time, the secondary cell assumes that the cell has been activated by the primary cell and may start transmission in the downlink (DL) at the activation time or allow some delay, to ensure that the cell has been properly activated. Additionally, the RNC may also assume that the primary Node B has successfully activated the secondary cell at the given activation time or at the time of the indication and start sending data to the secondary Node B. Alternatively, the RNC may delay sending data to the secondary cell to allow for proper activation time.

Alternatively, the secondary cell may only start transmission in the DL when it detects that a CQI report corresponding to the secondary HS-DSCH cell has been sent by the WTRU. Alternatively, the secondary cell may wait for an acknowledgment by the primary Node B that the activation has successfully taken place. This is also applicable to the case where the order is not sent from the Node B that took the decision. Alternatively, the secondary cell notifies the RNC upon determining that the secondary cell has been successfully activated. The notification may be in the form of a data request or as an explicit indication. A similar procedure may be followed for the deactivation of a secondary cell.

Upon notification of a fast deactivation of a secondary cell, the RNC may stop sending data to the WTRU. Optionally, for the methods described above, the secondary Node B may attempt to empty its buffer prior to deactivating the secondary cell. The RNC may stop sending new data to this secondary cell during this time.

Alternatively, the RNC makes the decisions and notifies the corresponding Node B of the decision and/or indicates to the Node B that an activation or deactivation should be performed.

It is understood that the notifications from Node B to Node B may be done directly, or via the RNC, where the RNC receives the notification first and then relays it to the other Node B.

Notifying the other Node B may be needed because the controlling Node B may not be able to send the order, or because the Node Bs need to know for scheduling and to ensure proper detection of the HS-DPCCH. When a secondary serving HS-DSCH cell in the same frequency is activated or deactivated, the HS-DPCCH format or coding may change. If this occurs, the serving Node B and/or other Node Bs may need to be notified of the change, so that it may properly decode the HS-DPCCH.

Alternatively, predefined rules for deactivation exist between the Node Bs. In one implementation, the rule may depend on the reported CQI values. The CQI values may be received and decoded by both Node Bs. When the CQI value or an average CQI of the secondary Node B has been below a threshold for a predefined period of time, then the secondary Node B is deactivated. The primary Node B, which is also aware of the reported CQI values, determines that the criteria has been met and deduces that the secondary Node B has been deactivated. If the HS-SCCH orders are only sent over the primary HS-SCCH, then the primary Node B sends a deactivation order to the WTRU.

Additionally, when the activation takes place, the Node B may also notify the RNC via Iur signaling of the activation, so proper transmission of the radio link control (RLC) packets may take place over both HS-DSCH cells. Likewise, when the deactivation takes place, the Node B notifies the RNC via Iur signaling of the deactivation, so that transmission of the RLC packets may be interrupted over the deactivated HS-DSCH cells.

The WTRU may be informed on a TTI by TTI basis (dynamic) whether or not it should receive data from the secondary serving cell (also referred to as an assistive transmission). In a first method, the WTRU monitors the HS-SCCH (potentially more than one channelization code) from the serving HS-DSCH cell. The HS-SCCH carries a special indication for the WTRU to combine or decode the HS-PDSCH from a different cell. This approach may apply to both soft combining and source multiplexing (multiflow) operations. This indication may be carried in the first part of the HS-SCCH, such that it is decoded before the associated HS-PDSCH is received.

Figure 8:
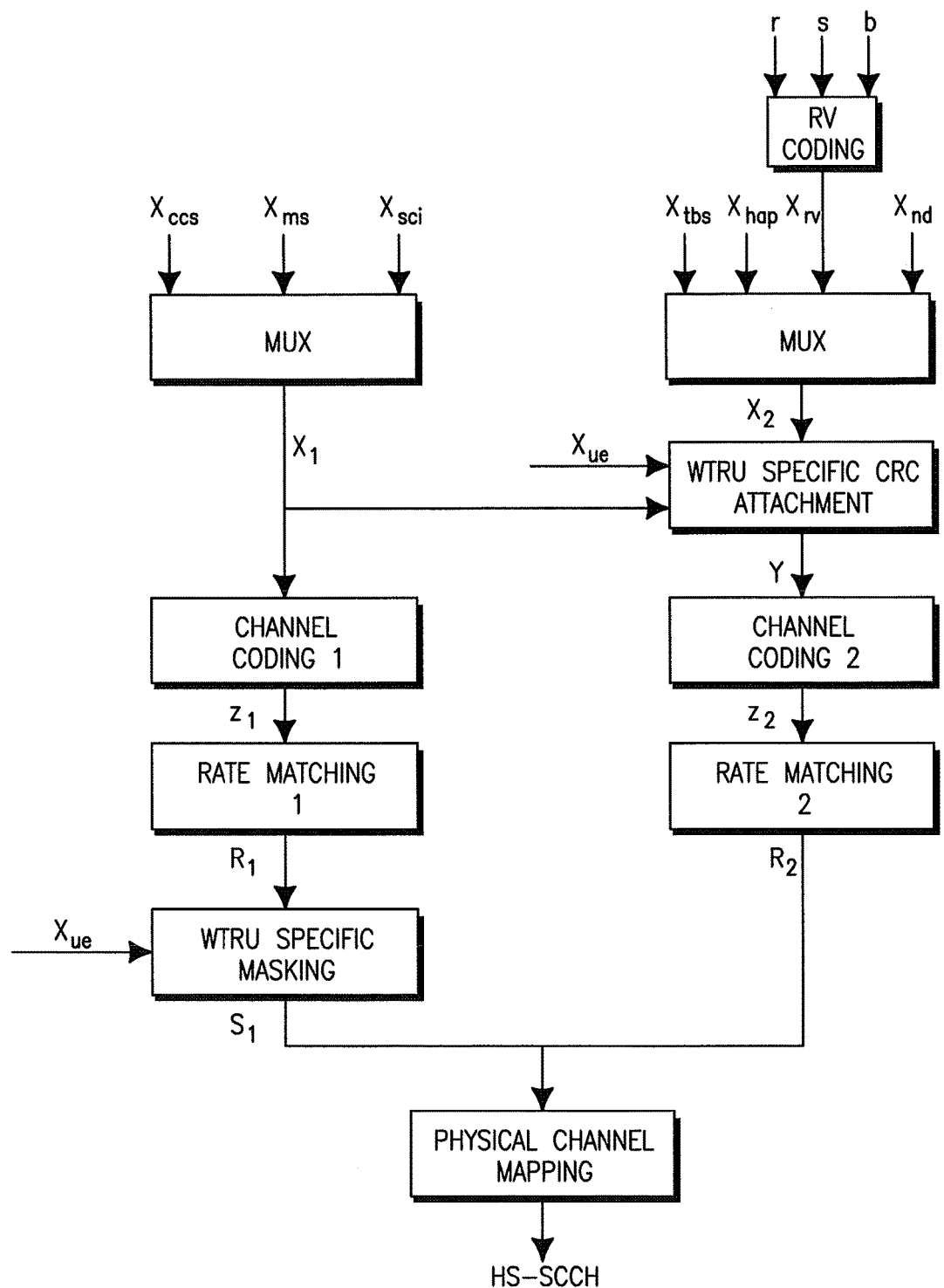
FIG. 8 is a diagram showing a high speed shared control channel (HS-SCCH) coding carrying a secondary cell indication bit.

In a first implementation of this method, a dedicated information bit is added to the HS-SCCH. This concept is illustrated in FIG. 8, where an additional bit ($X_{sci}$) is carried in the first part of the channel. This added bit requires changes in the rate matching block, which may require puncturing three more bits than the rate matching block in the conventional HS-SCCH type 1.

In an alternative approach to adding an information bit to the existing HS-SCCH coding scheme, one of the existing fields may be re-interpreted to carry the assistive transmission information. As an example, the $X_{ccs}$ field may be restricted, to free one information bit to carry the $X_{sci}$.

In a second implementation of this method, the presence of an assistive transmission or a transmission on the secondary cell is indicated to the WTRU by the Node B via a specific choice of channelization code from the set of configured HS-SCCH channelization codes. One way to implement this approach is to use the HS-SCCH number, that is, the configuration number of the HS-SCCH in the RRC configuration message (the order of the HS-SCCH in the RRC configuration message).

The HS-SCCH number information is already used when 64QAM is configured. More specifically, information is carried on the HS-SCCH mod 2 (even/odd characteristic). Because this HS-SCCH number may also be used when the WTRU is configured for 64QAM operations to ensure that the two features may work simultaneously, all combinations of $X_{sci}$ and even/odd HS-SCCH numbers are possible. This concept may be achieved as shown in Table 4.

TABLE 4

Example HS-SCCH and $X_{sci}$ mapping

| HS-SCCH number | HS-SCCH number mod 2 | Xsci |
|---|---|---|
| 0 | 0 | 0 |
| 1 | 1 | 0 |
| 2 | 0 | 1 |
| 3 | 1 | 1 |

As shown in Table 4, this particular mapping for the $X_{sci}$ with respect to the HS-SCCH number ensures that any combinations with HS-SCCH number mod 2 are possible. This particular implementation also may be extended to a larger number of HS-SCCH configured codes.

In a second method, the WTRU is configured to monitor one set of HS-SCCHs per activated cell. When the WTRU detects an HS-SCCH from a secondary cell, it decodes the associated HS-PDSCH. When soft combining is configured, the WTRU may be configured to not apply soft combining when the HS-SCCHs from the different cells for the same TTI indicate different transport block sizes or conflicting information.

In another implementation of this method, the network indicates the presence of an assistive transmission by sending the HS-SCCH over the secondary HS-DSCH cell; otherwise, the HS-SCCH on the primary cell is used. More specifically, the WTRU monitors a configured HS-SCCH set for each activated HS-DSCH cell. If the WTRU detects an HS-SCCH addressed to the WTRU from the secondary HS-DSCH cell, the WTRU then determines that an assistive transmission is taking place and starts receiving the corresponding HS-PDSCH on both HS-DSCH cells. If the WTRU detects an HS-SCCH addressed to the WTRU from the primary HS-DSCH cell, the WTRU determines that the data transmission is only taking place on the primary HS-DSCH.

In a third implementation of this method, the network indicates the presence of an assistive transmission by sending the HS-SCCHs simultaneously over both the primary HS-DSCH cell and the secondary HS-DSCH cell if the assistive transmission from the secondary serving cell occurs. While HS-PDSCH data is sent using the same scrambling code, mostly the one used by the primary serving cell, the HS-SCCHs are transmitted with different scrambling codes associated with each cell originally configured by RRC, so that they may be demodulated correctly at the WTRU. Both HS-SCCHs are addressed to the same WTRU by applying the same H-RNTI. If the WTRU detects an HS-SCCH addressed to the WTRU from the secondary HS-DSCH cell, the WTRU then determines that an assistive transmission is taking place and therefore starts receiving the corresponding HS-PDSCH on both HS-DSCH cells. Other information fields in the HS-SCCH from the secondary serving cell may be different from the primary serving cell, which may be used to indicate the transmission mode, as described above.

Figure 9:
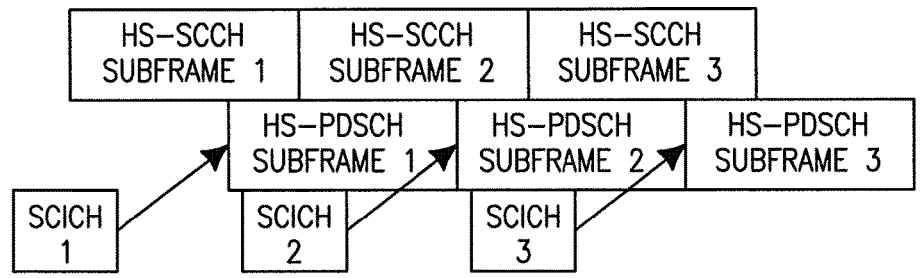
FIG. 9 is a block diagram showing one slot secondary cell indication channel (SCICH) timing.

In a third method, the WTRU monitors a new control channel carrying the assistive information ($X_{sci}$). This new control channel (secondary cell indication channel, SCICH) may be built using a similar structure as the existing fractional dedicated physical channel (F-DPCH) to minimize the code space usage and at the same time re-use the existing functionality. To ensure appropriate timing, this SCICH may be sent in the same slot as the associated first part of the HS-SCCH, as shown in FIG. 9, for example.

Figure 10:
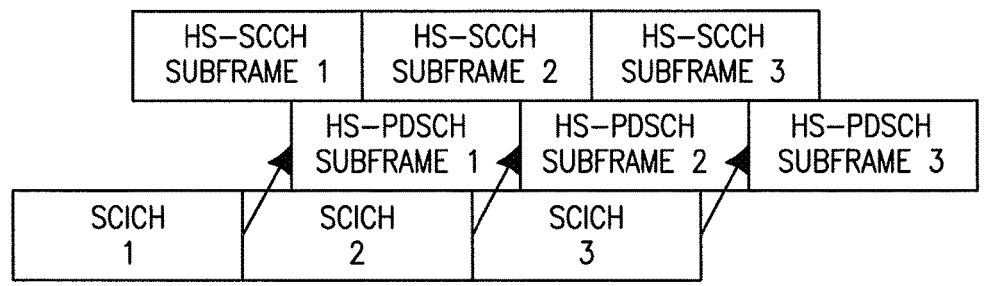
FIG. 10 is a block diagram showing three slots SCICH timing.

In another alternative, the SCICH carries the information over three consecutive slots and sends the information such that the last of the three slots is sent during the first part of the associated HS-SCCH. This concept is illustrated in FIG. 10, and allows transmission power savings as the WTRU may combine received energy from three slots before making the appropriate decision. The delay also allows for appropriate decoding of the HS-PDSCH. Alternatively in that case, the SCICH also may be carried using similar coding as the E-DCH HARQ acknowledgement indicator channel (E-HICH) and E-DCH relative grant channel (E-RGCH).

In an alternate solution, the presence of an assistive transmission or a transmission on the secondary cell is indicated to the WTRU by the Node B via a specific H-RNTI. More specifically, the WTRU may be configured with two H-RNTIs, a primary H-RNTI and a secondary H-RNTI. The WTRU may monitor the configured HS-SCCH set for one of the two H-RNTIs over the primary HS-DSCH cell. The WTRU is addressed with the primary H-RNTI when transmissions over the primary cell only are scheduled, while the secondary H-RNTI is used to schedule transmissions over the primary cell and the secondary cell. When the WTRU detects a HS-SCCH with the secondary H-RNTI, the WTRU determines that an assistive transmission or a transmission on a secondary cell is taking place.

In another solution, the network only uses assistive transmissions when it determines that the first transmission or a second transmission was not successfully received by the WTRU or, for example, when the channel conditions perceived by the WTRU for the primary cell are not satisfactory.

The Node B may use several criteria to determine whether to send an assistive transmission. The WTRU may then determine whether the scheduled transmission is being performed over one or more cells according to one or combination of the following criteria: the new data indicator, the RV of the transmission, the modulation format and TB size, or the HARQ process number.

If according to the new data indicator, the current transmission corresponds to a retransmission, the WTRU starts receiving over both cells.

When using the RV of the transmission, if the WTRU detects that the transmission is performed using a special combination of the s,r,b bits, e.g., the $X_{rv}$ value corresponds to a predetermined value, then the WTRU knows that the transmission is an assistive transmission. Alternatively, this criteria may also depend on the specific "s" value. For example, if s=1, the Node B performs assistive transmissions; otherwise it only transmits over the primary HS-DSCH cell. Alternatively, this criteria may depend on the value of the r bit, or a combination of the s and r bits.

When using the modulation and TB size, the Node Bs only perform assistive transmissions for a subset of TB sizes and modulation format. If the WTRU determines that the TB size and/or modulation format corresponds to one of these preconfigured subsets, it performs assistive reception of data.

When using the HARQ process number, the WTRU and the Node B are preconfigured to use assistive transmissions only when a certain HARQ process is used. For example, if the WTRU determines that the HARQ process ID indicated in the HS-SCCH corresponds to one such preconfigured HARQ process, it performs assistive reception over both HS-DSCH cells.

The decision to perform assistive transmissions may be dependent on the CQI reported by the WTRU on both cells. For example, if the CQI value on the serving cell is below a threshold for a configured period of time and the CQI value of the secondary serving cell is above a threshold, the Node B may perform assistive transmissions. When this criteria is met, the Node B starts assistive transmissions, and when it determines that this criteria is met, then it autonomously starts to receive as if assistive transmissions are ongoing.

Figure 11:
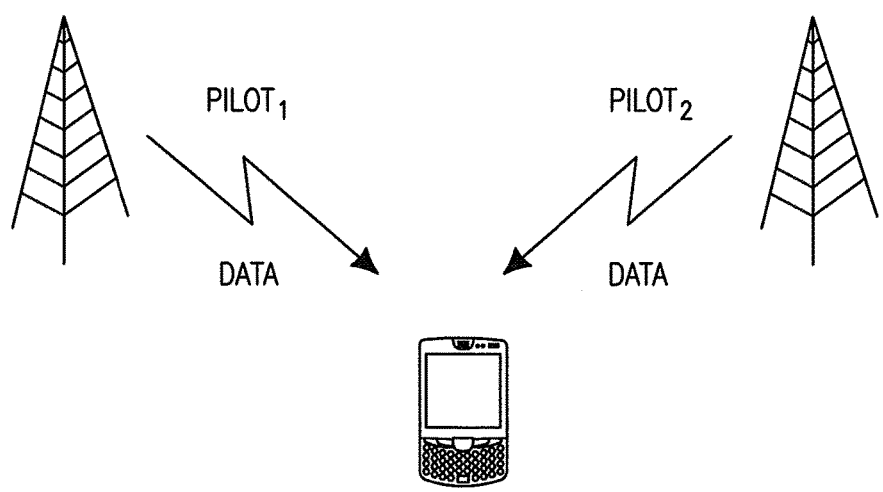
FIG. 11 is a diagram showing soft combining operations.

Methods to improve soft combining at the WTRU are described below. In soft combining operations, the multiple Node Bs transmit the same data to the WTRU at the same time (with some reasonable delay requirements). In one option, the data is sent by the Node Bs using the same physical format, e.g., using the same spreading, scrambling, physical mapping, and encoding such that the WTRU may combine the signal at the chip or symbol level. In another option, the data is sent by the Node Bs using a different physical format (different spreading codes, scrambling, and physical channel mapping) but the same coded bits are transmitted, such that the WTRU may combine the data at the coded bit level (symbol level). To correctly demodulate the data from both Node Bs, the WTRU requires a distinct pilot signal from each Node B to perform channel estimation; this concept is illustrated in FIG. 11.

For the WTRU to perform optimal combining, at the chip level or the symbol level, it is required to have knowledge of the channel over which the data is transmitted from each Node B. More specifically, the WTRU requires knowledge of the effective channel it sees from both Node Bs. The effective channel may be interpreted as the combination of the two data channels as perceived by the WTRU. Because the data channels may be transmitted with different relative power with respect to the pilot channel from each Node B, the effective channel for the data signal is different than the effective channel perceived for the pilot signals. With the existing mechanisms, the WTRU may only measure the effective channel from the pilot signals.

The performance of soft combining at the WTRU may be improved by signaling power offset information. In this approach, the WTRU is informed of the relative power between the data signal and the pilot signal from one or more of the HS-DSCH cells in the serving HS-DSCH cell set for that WTRU. The WTRU uses the power offset information in its receiver to improve the performance via better channel estimation and improved combining (for example, maximum ratio combining).

The network may inform the WTRU of the data-to-pilot power offset (or equivalently the pilot-to-data power offset) for the secondary serving HS-DSCH cell(s) on a dynamic, semi-static, or static basis. In one option, each cell in the serving HS-DSCH cell set signals the WTRU with the data-to-pilot power offset used.

In dynamic data-to-pilot power offset signaling, the network signals the data-to-pilot power offset to use for data demodulation on a TTI by TTI basis. The data-to-pilot power offset may be carried on the HS-SCCH along with the conventional information carried on the HS-SCCH for data demodulation.

Figure 12:
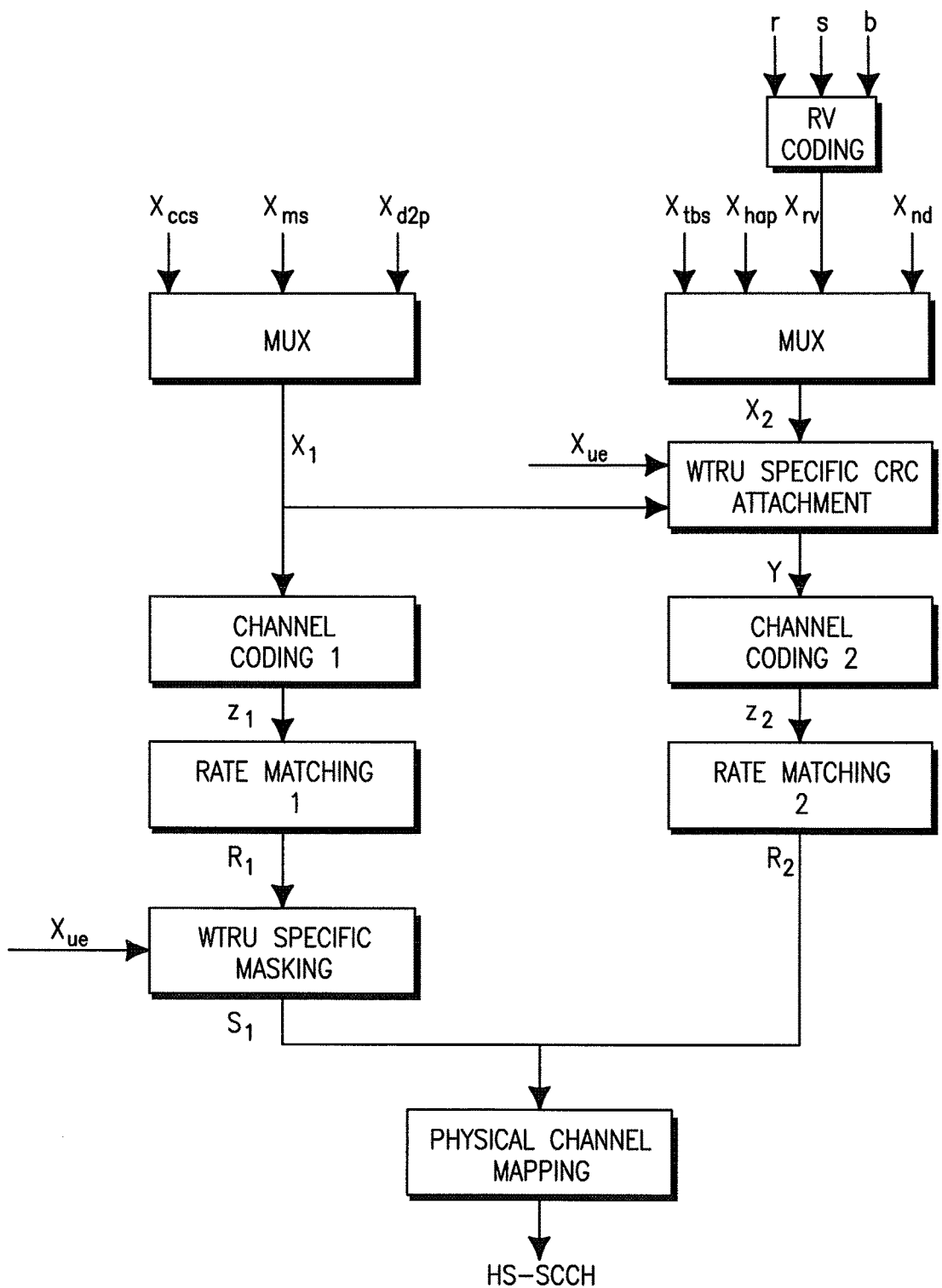
FIG. 12 is a diagram showing an example HS-SCCH type 1 carrying data-to-pilot information.

In a first approach to dynamic data-to-pilot power offset signaling using the HS-SCCH, the data-to-pilot power offset information is carried in the first part of the HS-SCCH so that the information may be used for HS-PDSCH demodulation. In one option, a new encoding scheme for the HS-SCCH is designed to carry the new information. This encoding scheme incorporates a new set of bits carrying the data-to-pilot information ($X_{d2p}$) in addition to the channelization code set bits ($X_{ccs}$) and modulation schemes bits ($X_{ms}$), a concept illustrated in FIG. 12.

In one implementation, the same number of bits is carried in $X_1$ so that no modification to the conventional encoding scheme is necessary. This may be accomplished by reducing the allowable channelization code set and modulation scheme set for the WTRU configured in multipoint HSDPA. The bits freed from that reduction may be used for the d2p field and the conventional channel coding 1, and rate matching 1 may be re-used.

In another implementation, the same number of channelization code set and modulation scheme bits are used and $X_1$ also carries the additional $X_{d2p}$ bits. To achieve this, the rate matching may be changed to puncture less bits, leading to a higher code rate and potentially requiring more power for the same reliability. For example, if $X_{d2p}$ carries three bits of information, the new $Z_1$ has 57 bits, and since the new $R_1$ may have 40 bits, a total of 17 bits may be punctured, as opposed to eight in the conventional HS-SCCH type 1. The choice of the additional nine bits to puncture may be based on offline simulations, for example.

The dynamic approach potentially leads to the best performance at the expense of additional downlink overhead. For inter-Node B operations, this approach also requires a fast backhaul link between the Node Bs in the serving HS-DSCH cell set such that the power offset is relevant when it is transmitted by the serving Node B cell.

Alternatively, the HS-SCCH is also transmitted from the secondary serving HS-DSCH cell. For intra-Node B operations, there is no backhaul link requirement and the information may be carried in the HS-SCCH associated to the serving HS-DSCH cell only. The HS-SCCH transmitted over the secondary serving HS-DSCH cell may be encoded according to the solutions described above.

In an alternate solution, the HS-SCCH transmitted over the secondary serving HS-DSCH cell may contain a reduced set of information. Given that the HS-DPSCH information sent over the cells is the same, the HS-SCCH information such as channelization code set, modulation scheme, TB size, HARQ, RV, and new data indication in addition to other information, such as, but not limited to, WTRU identity, are transmitted over one of the cells, such as the primary HS-DSCH cell. The other HS-DSCH cell transmits the data-to-pilot power ratio and optionally any other potential information differentiating the two transmissions. For example, the following information may be transmitted by the new HS-SCCH over the secondary HS-DSCH cell:

Data-to-pilot power offset (y bits): $x_{d2p,1}, x_{d2p,2}, \ldots x_{d2p,y}$
WTRU identity (16 bits): $x_{ue,1}, x_{ue,2}, \ldots, x_{ue,16}$ where y may depend on the range and granularity of the required power offset.

In the semi-static signaling approach, the network signals the data-to-pilot power offset at most at each HS-DSCH transmission instant (for which there is data transmitted on the secondary serving HS-DSCH cell). This may be achieved using a new L1 signaling mechanism. In one example of the L1 signaling mechanism, a new HS-SCCH order is used. The network signals the data-to-pilot power offset information in the form of an index to a predefined table of data-to-pilot power offset values.

The following information may be transmitted by means of the conventional HS-SCCH order physical channel:
Order type (3 bits): $x_{odt,1}$, $x_{odt,2}$, $x_{odt,3}$
Order (3 bits): $x_{ord,1}$, $x_{ord,2}$, $x_{ord,3}$
WTRU identity (16 bits): $x_{ue,1}$, $x_{ue,2}$, ..., $x_{ue,16}$ In one example, a new order type is defined for the power offset HS-SCCH order and the power offset index is carried in the three bits of the HS-SCCH order bits. For example, when order type $x_{odt,1}$, $x_{odt,2}$, $x_{odt,3}$="101," then the mapping for $x_{ord,1}$, $x_{ord,2}$, $x_{ord,3}$ may be as shown in Table 5 and indicates the data-to-pilot power offset.

TABLE 5

HS-SCCH order mapping for data-to-pilot power offset

| $x_{ord,1}$ | $x_{ord,2}$ | $x_{ord,3}$ | Index to data-to-pilot power offset |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

Upon receiving the HS-SCCH order indicating the pilot-to-data power offset, the WTRU calculates the actual value of the pilot-to-data power offset by finding the data-to-pilot power offset entry in a pre-configured pilot-to-data power offset reference table (e.g., as shown in Table 6) corresponding to the signaled data-to-pilot offset index (D2PI). Optionally, the network also configures an additional offset index (AOI) that the WTRU applies to the D2PI to obtain the actual pilot-to-data power offset. In such case, the actual index to the reference table becomes D2PI+AOI.

TABLE 6

Example pilot-to-data power offset reference table

| D2PI | Pilot-to-data power offset (dB) |
|---|---|
| 0 | 0 |
| 1 | 0.5 |
| 2 | 1 |
| ... | ... |
| 10 | 15 |

In another alternative to signaling semi-static data-to-pilot power offset, the network signals the data-to-pilot power offset (or equivalently an index to a table with the optional additional offset index as described above) via a L2 message. For example, the data-to-pilot power offset may be carried in the header of the MAC-ehs (or the new MAC layer supporting the multipoint HSDPA functionality). This new header field may carry the index to the quantized pilot-to-data power offset table. A new MAC control PDU may be created to signal to the WTRU the power offset. To indicate to the WTRU that the MAC PDU corresponds to a control PDU, a special value of the logical channel identifier (LCH-ID) may be reserved to indicate that the payload corresponds to a control PDU and for this case multipoint HSDPA control information. Optionally, a new field may follow the LCH-ID, indicating what type of control PDU the payload corresponds to. This may be beneficial to introduce other control PDUs.

The WTRU applies the signaled pilot-to-data power offset for receiving the next HS-PDSCH (for example, when L1 signaling is used) or alternatively after a pre-configured time delay following reception of the data-to-pilot power offset value. The WTRU maintains the same pilot-to-data power offset value until it receives a new value, until a physical channel reconfiguration is received, or until the secondary HS-DSCH serving cell is deactivated.

In an example of static data-to-pilot power offset signaling, the WTRU is configured by the network with a data-to-pilot power offset value via RRC signaling. The network may signal an index to a table of quantized values. The WTRU applies the data-to-pilot power offset for HS-DSCH reception when appropriate (i.e., whenever it receives data from the secondary HS-DSCH cell which it knows is destined to be soft-combined).

The WTRU maintains the data-to-pilot power offset signaled by the network until a new value is configured. In one option, the WTRU receives a data-to-pilot power offset via RRC signaling which it uses until it receives a new value via one of the approaches described above.

In another option, the network signals the WTRU with a measurement power offset Γ (in dB) for each cell in the serving HS-DSCH cell set. The WTRU determines the relative power of the data channel from each cell based on this measurement power offset. It is assumed that the measurement power offset represents the power offset for the data transmission with respect to the pilot power. The WTRU then applies the measurement power offset (e.g., in the linear domain) to each channel estimate to obtain the correct effective channel estimate. The concept may be further detailed as follows:

$$\hat{h}_{\text{eff}} = \sum_{l=1}^{L} \Gamma_l \hat{h}_l$$

where $\Gamma_l$ is the measurement power offset for the $l^{th}$ serving HS-DSCH cell (e.g., for l=1, this corresponds to the serving HS-DSCH cell; l=2 corresponds to the secondary serving HS-DSCH cell), $\hat{h}_l$ is the channel estimate for the $l^{th}$ cell (based on the pilot signal only), and $\hat{h}_{\text{eff}}$ is the resulting effective channel estimated.

In another solution, the WTRU assumes for detection that the same data-to-pilot power offset is used throughout the cells in the serving HS-DSCH cell set. While this may lead to potentially non-optimal reception performance at the WTRU for the soft combining approach, the network may control the WTRU performance by determining on its own the relative power of the data signal versus the pilot signal on each cell.

The network, based on the CQI information it receives from the WTRU, determines the modulation coding set (MCS), the amount of data, and the power. To ensure optimal detection performance the network may use the same data-to-pilot power and MCS for all cells transmitting the data to the WTRU (so that the WTRU derives the optimal filter weights or RAKE fingers). This has the advantage of not requiring additional signaling from the network. A single HS-SCCH may be used (e.g., from the serving HS-DSCH cell). This also allows two forms of WTRU receiver implementation: chip-level equalization and symbol-level combining (e.g., at the HARQ level).

Alternatively, the network may use the same data-to-pilot power and coded data for all cells, but potentially use a different modulation and coding scheme (i.e., different RV). This approach has the advantage of not requiring additional signaling for the data-to-pilot power offset. The different MCS needs to be signaled to the WTRU (via one HS-SCCH per cell). This allows only one form of WTRU implementation: symbol-level combining (e.g., at the HARQ level).

Discontinuous downlink reception (DRX) is a continuous packet connectivity (CPC) feature aimed at WTRU power saving while maintaining WTRU data connectivity. In DRX mode, the WTRU is allowed to receive downlink data discontinuously according to a preconfigured DRX reception pattern. In multi-carrier (DC-HSDPA or 4C-HSDPA) realization, implementation of DRX is straightforward, because the same reception pattern may be used for all cells involved in the transmission. This is feasible because the cells are assumed belong to the same Node B, and therefore all the related downlink transmissions may be synchronized.

In multiple point transmission, particularly for inter-Node B deployment, the cells in operation may not be synchronized due to the asynchronous nature of the UMTS network. Therefore, the DRX related procedures, such as DRX activation or deactivation, may need to be modified to accommodate the inter-site deployment requirement.

To maximize the power saving benefit for users, the DRX operations in both the primary serving cell and the secondary (assistive) serving cell may be coordinated, such that the reception patterns used by the two cells are aligned in time as much as possible. The same set of DRX parameters or just one set of DRX parameters, such as the DRX cycle, are configured in both cells. By engaging the radio interface synchronization procedure, the Connection Frame Numbers (CFNs) associated with the transmission of a F-DPCH for both cells may be aligned with a certain level of accuracy. By using this aligned CFN, a control algorithm may be designed to generate coordinated downlink DRX reception patterns for both cells. Due to potential variation of the timing relation of the F-DPCH and HS-SCCH radio frames at different cells, an additional time adjustment procedure may be used to align the two reception patterns.

For example, denote the time difference of the F-DPCH and the HS-SCCH as $\tau_{DRX0}$ for the primary serving cell, and $\tau_{DRX1}$ for the secondary serving cell. When the network configures the timing offset parameter, UE_DTX_DRX_Offset, it is required to set it differently for the two serving cells. More specifically, the relation of the two timing offset parameters should satisfy the following:

(UE_*DTX_DRX*_Offset0−UE_*DTX_DRX*_Offset1)= ($\tau_{DRX1} - \tau_{DRX0}$)

Note that ($\tau_{DRX1} - \tau_{DRX0}$) should be expressed in terms of subframes and rounded to the nearest integer.

For the primary serving cell, the HS-SCCH reception pattern is the set of subframes whose HS-SCCH DRX radio frame number (CFN_DRX) and subframe number (S_DRX) verify:

((5×CFN_*DRX*0−UE_*DTX_DRX*_Offset0+S_*DRX*0) MOD UE_*DRX* cycle)=0 where CFN_DRX0 is for the primary serving cell and is the radio frame number of the HS-SCCH associated with the corresponding F-DPCH radio frame, which is aligned between the two serving cells via the radio interface synchronization procedure. S_DRX0 is the HS-SCCH subframe number for the primary serving cell among a radio frame, ranging from 0 to 4. The UE_DRX cycle is a parameter configured by higher layers that specifies the repetition cycle of the HS-SCCH reception pattern.

For secondary serving cell, the HS-SCCH reception pattern is the set of subframes whose HS-SCCH CFN_DRX and S_DRX verify:

((5×CFN_*DRX*1−UE_*DTX_DRX*_Offset1+S_*DRX*1) MOD UE_*DRX* cycle)=0 where CFN_DRX1 is for the secondary serving cell and is the radio frame number of the HS-SCCH associated with the corresponding F-DPCH radio frame, and S_DRX1 is the HS-SCCH subframe number for the secondary serving cell.

As an alternative solution, the network may configure an additional timing offset parameter as calculated by:

UE_*DRX*_Offset=UE_*DTX_DRX*_Offset0−UE_*DTX_DRX*_Offset1+($\tau_{DRX0} - \tau_{DRX1}$)

This time offset parameter is then applied to calculation of the reception pattern only on the secondary serving cell as follows:

((5×CFN_*DRX*1−UE_*DTX_DRX*_Offset1−UE_*DRX*_Offset+S_*DRX*1)MOD UE_*DRX* cycle)=0

In this case, UE_DTX_DRX_Offset0 and UE_DTX_DRX_Offset1 may be configured independently by the individual Node Bs.

When DTX mode is activated, the Node Bs in the multipoint operation will perform transmission according to the reception patterns described above, respectively for primary and secondary serving cells.

At the WTRU, because the reception patterns are aligned or nearly aligned as result of the timing adjustment procedure, the WTRU only needs to implement a common state machine that calculates one set of reception patterns according to the timing counter provided in either of cells. Once the state machine determines that it is the time interval to wake up the WTRU, it starts monitoring HS-SCCHs from both cells for potential data reception. To avoid potentially missing the data transmission because of a slight residual offset between the reception patterns for different cells, the WTRU may monitor one or a few more additional subframes around the receiving interval. Alternatively, the WTRU may ensure that the full HS-SCCH of the cell that is slightly offset is monitored, even though according to the formula above, the HS-SCCH monitoring of the other cell has been completed and the WTRU should turn off the receiver.

Figure 13:
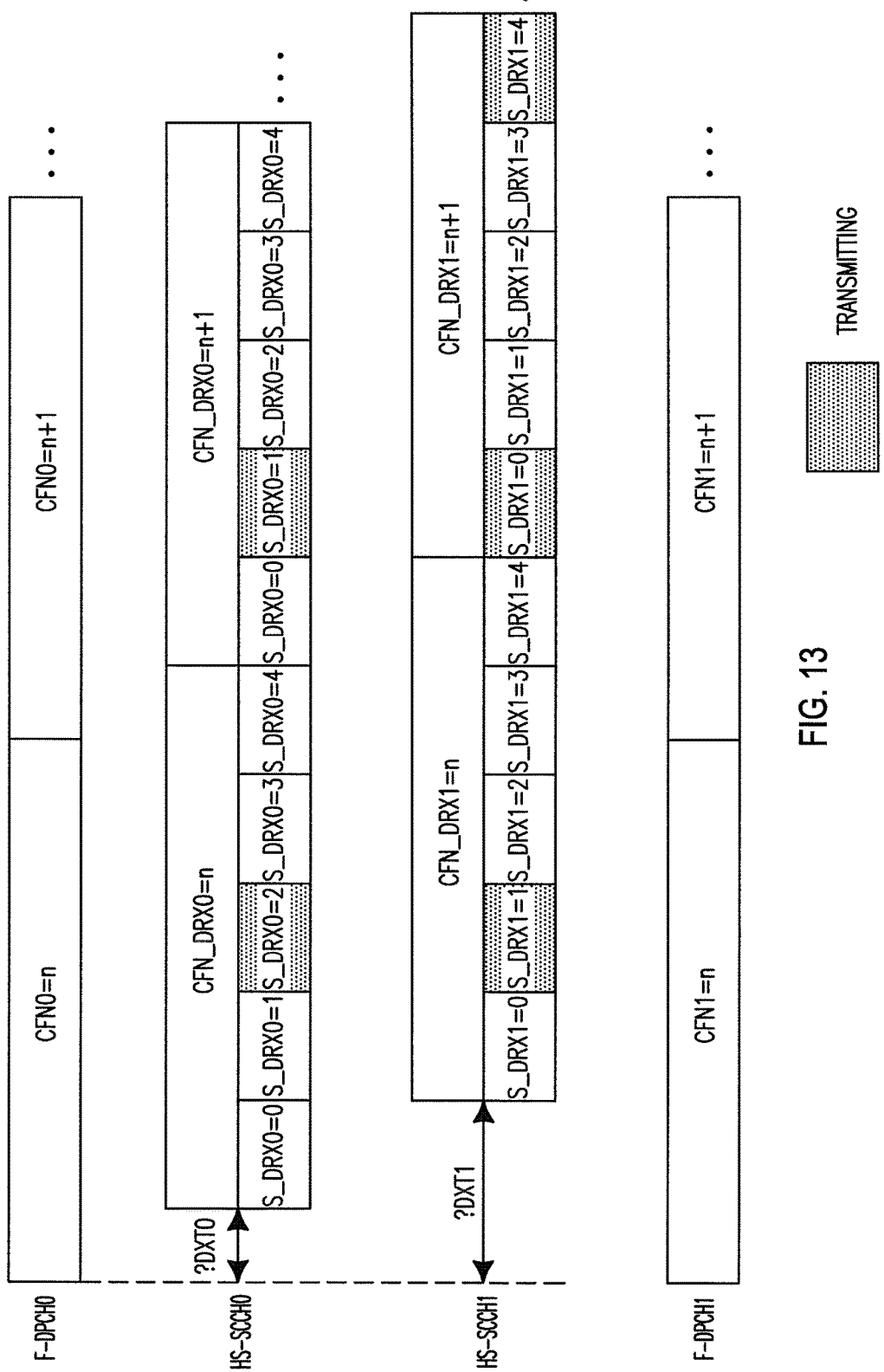
FIG. 13 is a diagram showing an example of aligning the discontinuous reception (DRX) reception patterns.

An example of aligning the reception patterns is shown in FIG. 13, where the parameters are set as: UE_DRX_cycle=4, $\tau_{DRX0}$=1 subframe, $\tau_{DRX1}$=2 subframes, and the timing offset parameters should satisfy the constraint:

(UE_*DTX_DRX*_Offset0−UE_*DTX_DRX*_Offset1)=1

In another solution, the network will not maintain multiple DRX reception patterns for a multipoint transmission or attempt to synchronize them. Instead, only one DRX reception pattern is determined by using the set of counters or parameters configured for one cell. For example, a DRX reception pattern is determined by the existing rules in the 3GPP standard, using the timing parameters from the primary serving cell. For the DRX operation of the other cells in the multipoint transmission, the corresponding wakeup interval for transmission for a cell is determined by finding the subframes that overlap with the primary reception pattern.

Due to the asynchronous nature between cells, it is possible that only part of a subframe is overlapped with the primary reception pattern and possibly two consecutive subframes may fall into the same wakeup interval. In this case, rules are defined to make unique selection of the subframes with a number of options: the subframe with the most overlap time with a wakeup interval defined by the reception pattern; the first subframe that overlaps with a wakeup interval defined by the reception pattern; or the last subframe that overlaps with a wakeup interval defined by the reception pattern.

The WTRU maintains one state machine that generates the reception pattern. For the data reception from the other serving cells, it monitors HS-SCCHs in the subframes that satisfy the rules described above.

As an example, the HS-SCCH reception pattern is the set of subframes whose HS-SCCH CFN_DRX and S_DRX verify:

$$((5 \times CFN\_DRX - UE\_DTX\_DRX\_Offset + S\_DRX) \\ MOD\ UE\_DRX\ cycle) = 0$$

Then in the multipoint HSDPA transmission mode, the HS-SCCH reception pattern is generated only for the primary serving cell. The HS-SCCH reception subframes for the other serving cells are derived from this pattern by finding the last one, for example, that overlaps with a subframe timing interval defined by the HS-SCCH reception pattern.

Either for the independent or coordinated DRX operation described above, it may be beneficial if all cells in transmission enter into the DRX mode concurrently, because the entire radio front end at the WTRU may be stopped during the inactive period to maximally claim the power saving benefit. A control mechanism may be provided that enables coordinated activation or deactivation of the DRX mode among the cells.

The Node B at either of the cells may act on its own to initiate activation or deactivation of the DRX operation based on the information it has perceived regarding the data traffic or WTRU operating status. Once the Node B scheduler decides to activate or deactivate the DRX mode for a WTRU, it sends an (de)activation HS-SCCH order to the WTRU directly without any supervision from the RNC.

A notification is signaled concurrently or afterwards to the serving RNC (SRNC) via the Iur interface, to inform the RNC about the DRX activation/deactivation. Upon receiving this notification, the SRNC may further send a command to the Node B(s) at other cell(s) involved in the multipoint transmission. This command may include an order that directs the Node B to start (or stop) the DRX mode, and/or optionally the timing information (e.g., specified by a CFN) that tells the Node B when to activate or deactivate DRX mode.

The Node B that receives the DRX activation/deactivation command from the SRNC signals a DRX activation/deactivation order over the HS-SCCH to the WTRU, allowing the downlink transmission carried over this serving cell to enter (or quit) the DRX mode. Alternatively, if a common DRX state is implemented in the WTRU and the order has been received by the first cell, the Node B does not have to send another DRX order. Upon notification of the DRX activation/deactivation from the SRNC or the other Node B, the Node B may simply start or stop DRX operation.

Figure 14:
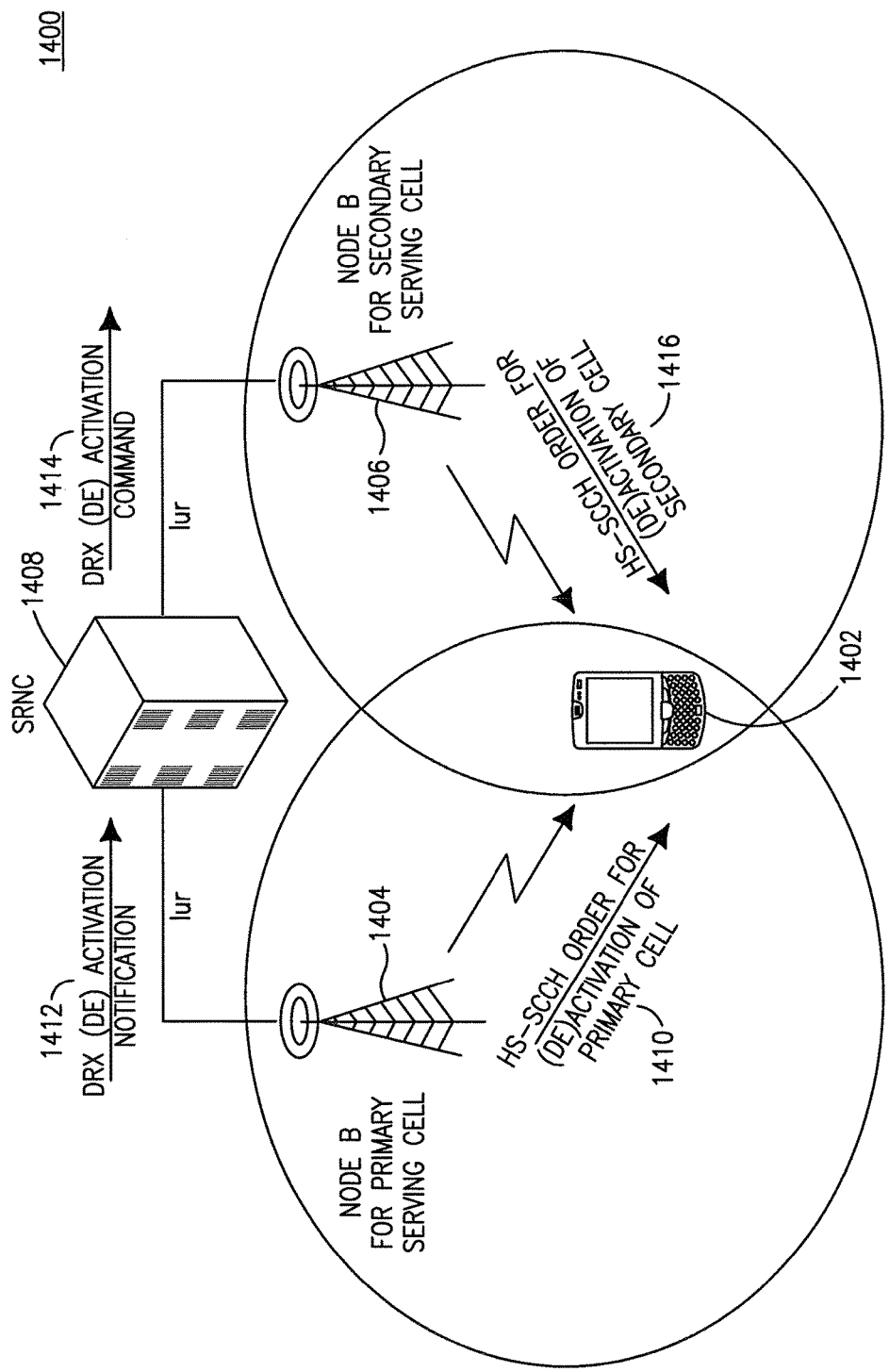
FIG. 14 is a diagram showing a notification-based DRX activation/deactivation procedure.

FIG. 14 is a flow diagram of the notification-based DRX activation/deactivation procedure 1400. In the procedure 1400, a WTRU 1402 communicates with a Node B for the primary serving cell 1404 and a Node B for the secondary serving cell 1406. The Node Bs 1404 and 1406 communicate with a serving RNC (SRNC) 1408.

The WTRU 1402 receives a HS-SCCH order for activation or deactivation of the primary cell from the Node B 1404 (step 1410). The Node B 1404 sends a corresponding DRX activation or deactivation notification to the SRNC 1408 (step 1412). The SRNC 1408 sends a DRX activation or deactivation command to the Node B 1406 (step 1414). The Node B 1406 sends a HS-SCCH order for activation or deactivation order for the secondary cell to the WTRU 1402 (step 1416).

With the notification-based DRX activation/deactivation, latency will likely exist in the DRX activation/deactivation over different cells. To allow all the cells to enter (or quit) the DRX mode simultaneously, the initiating Node B may send the notification to the SRNC or the other Node B first (e.g., prior to sending an order to the WTRU). In the notification message, the initiating Node B may include timing information of the activation/deactivation. For example, the initiating Node B may specify the CFN that it is going to signal the HS-SCCH order to the WTRU.

Alternatively, a fixed delay from the reception of the notification to the activation/deactivation may be specified. This notification message is forwarded to the other Node Bs in the multipoint transmission, such that they can prepare for the activation/deactivation. At the specified timing defined by the timer or by the specified CFN, one of the Node Bs (e.g., the initial or primary Node B) may send the HS-SCCH order to the WTRU to start (or stop) the DRX mode for all the serving cells. Optionally, the other serving Node Bs may also send the same order over their corresponding downlink to improve reliability.

Figure 15:
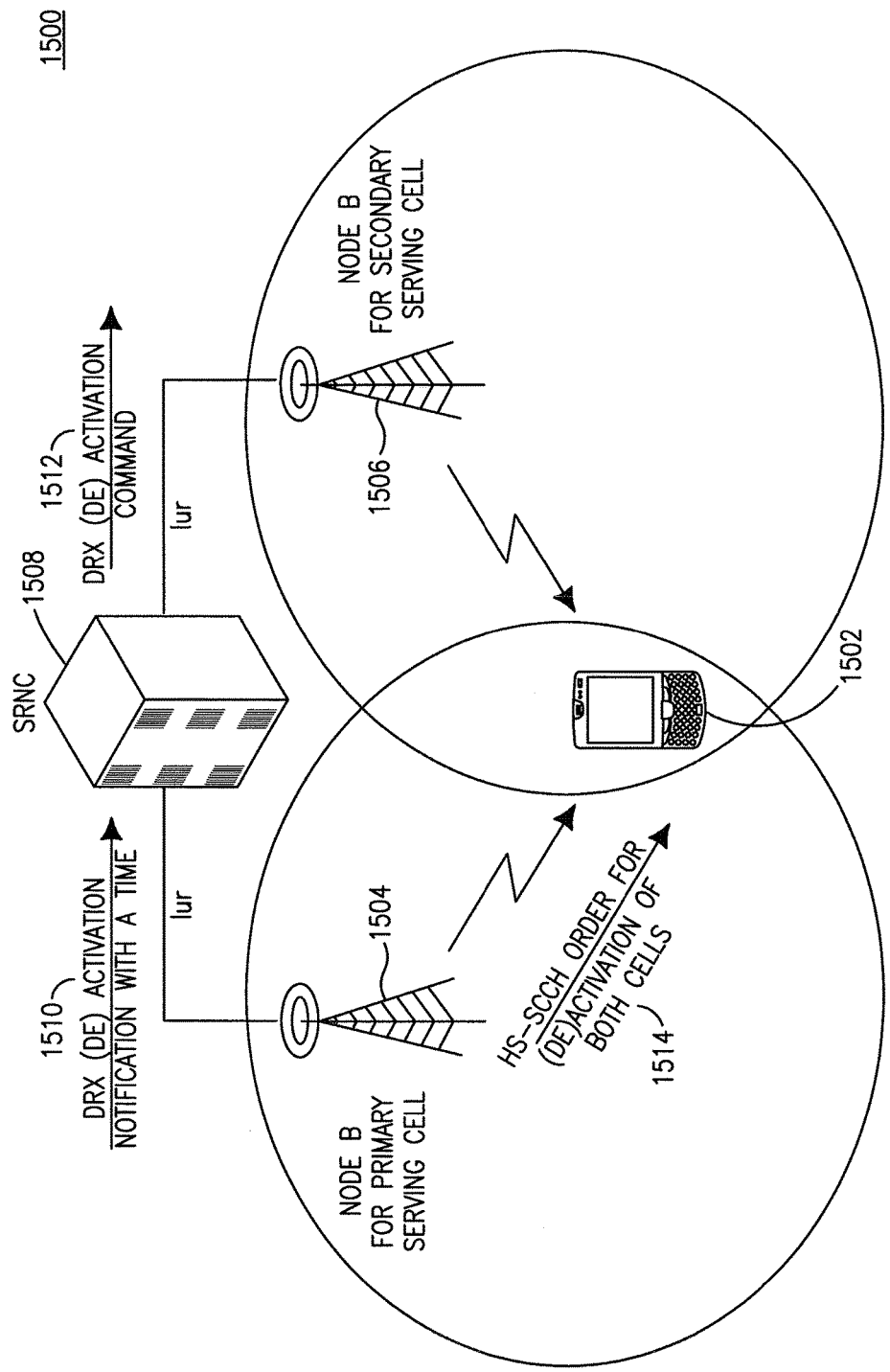
FIG. 15 is a diagram showing a DRX activation/deactivation procedure with a timer.

FIG. 15 is a flow diagram of a DRX activation/deactivation notification procedure 1500 including a timer. In procedure 1500, a WTRU 1502 communicates with a Node B for the primary serving cell 1504 and a Node B for the secondary serving cell 1506. The Node Bs 1504 and 1506 communicate with a serving RNC (SRNC) 1508.

The Node B 1504 sends a DRX activation or deactivation notification to the SRNC 1508, with the notification including timing information (step 1510). As noted above, the timing information may include a fixed time of the activation or deactivation command or a delay value indicating a relative time until the sending of the activation or deactivation command. The SRNC sends a DRX activation or deactivation command to the Node B 1506 based on the timing information (step 1512). Also based on the timing information, the Node B 1504 sends a HS-SCCH order for activation or deactivation of both the primary cell and the secondary cell to the WTRU 1502 (step 1514).

In handshake-based DRX activation/deactivation, the initiating Node B sends a DRX activation/deactivation request to the SRNC, instead of a notification message as described above. The SRNC decides whether the request is granted or not. The SRNC may evaluate the request based on the higher layer traffic condition and buffer status, together with the WTRU operating conditions it received through the WTRU measurement report. Once the SRNC decides that the request is granted, it sends a grant message to the initiating Node B, which may also include timing information specified by a CFN to inform the Node B when to transmit the HS-SCCH order to the WTRU. In the meantime, the same message or a similar message is sent to other Node Bs in the multipoint transmission to initiate the DRX activation/deactivation on other serving cells. If the SRNC decides not to grant the request, it may send a NACK message to the initiating Node B to invalidate the request. Or optionally, the SRNC does not respond to the request at all. If a timer set at the Node B expires before it receives the grant from SRNC, the Node B knows the request was not granted.

Figure 16:
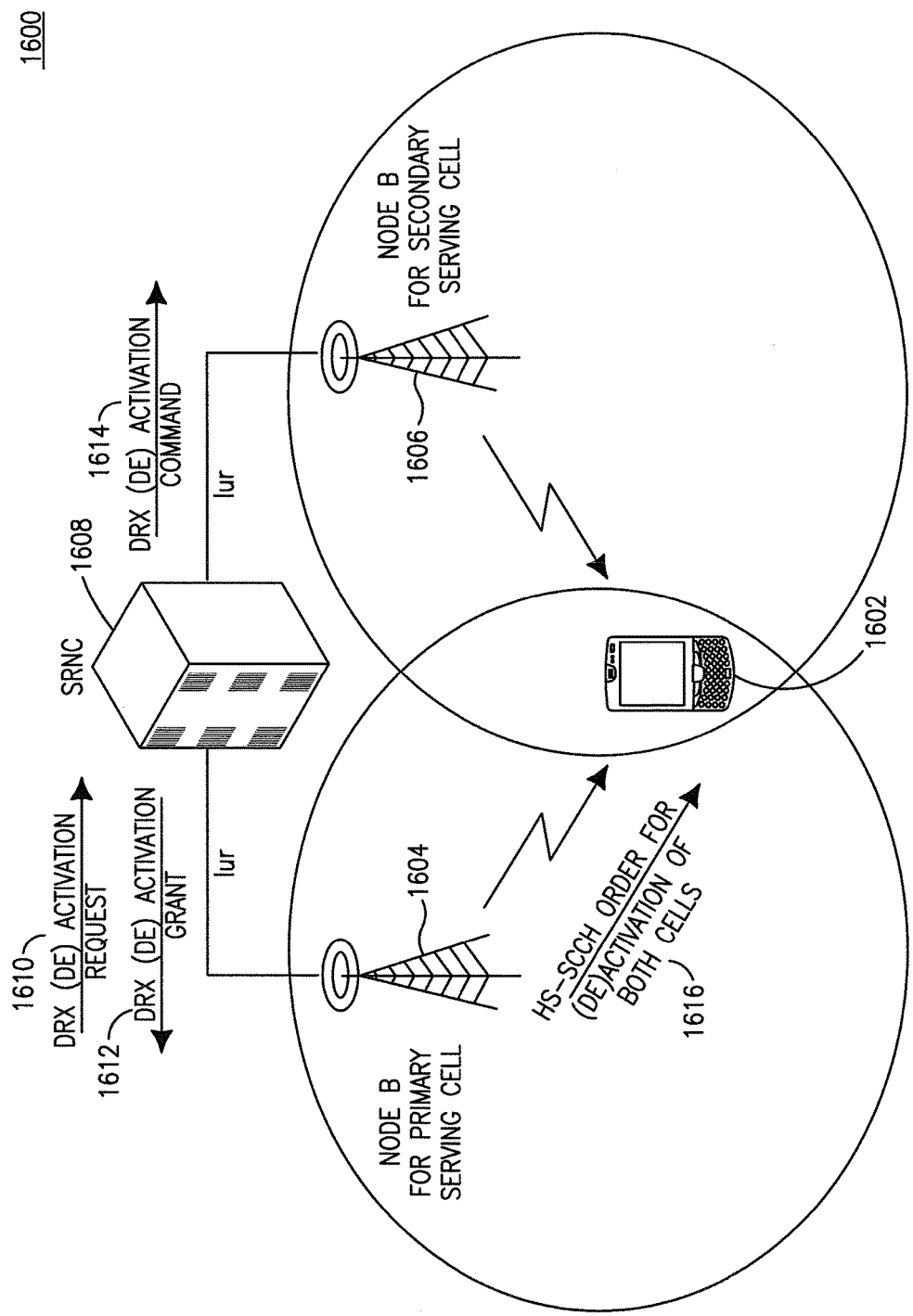
FIG. 16 is a diagram showing a handshake-based DRX activation/deactivation procedure.

FIG. 16 is a flow diagram of the handshake-based activation/deactivation procedure 1600. In the procedure 1600, a WTRU 1602 communicates with a Node B for the primary serving cell 1604 and a Node B for the secondary serving cell 1606. The Node Bs 1604 and 1606 communicate with a serving RNC (SRNC) 1608.

The Node B 1604 sends a DRX activation or deactivation request to the SRNC 1608 (step 1610). The SRNC 1608 sends a DRX activation or deactivation grant to the Node B 1604 (step 1612) and sends a corresponding DRX activation or deactivation command to the Node B 1606 (step 1614). It is noted that steps 1612 and 1614 may occur simultaneously or in a reversed order (so that step 1614 happens before step 1612) without affecting the operation of the procedure 1600. After receiving the grant from the SRNC 1608, the Node B 1604 sends a HS-SCCH order for activation or deactivation of both the primary cell and the secondary cell to the WTRU 1602 (step 1616).

In step 1616, only the initiating Node B 1604 sends the HS-SCCH order to the WTRU 1602, which activates or deactivates DRX operation for all serving cells in the multipoint operation. Optionally, the separate HS-SCCH orders may be sent by other Node Bs, possibly with an intention to have the DRX operation being activated or deactivated at a slightly different timing. This timing difference may be controlled by the SRNC 1608 via timers specified in the grant messages addressed to the different Node Bs.

The DRX activation or deactivation may be initiated by the serving RNC only. The RNC makes the decision based on the traffic conditions and the Node B scheduling status it perceives. At the time the RNC decides to activate or deactivate the DRX mode for a WTRU, it signals all related Node Bs in the multipoint transmission with a command message that specifies the action to be taken and the time of the execution. Upon receiving the command message, the Node Bs send either a single or separated HS-SCCH orders to the WTRU to complete the action.

Figure 17:
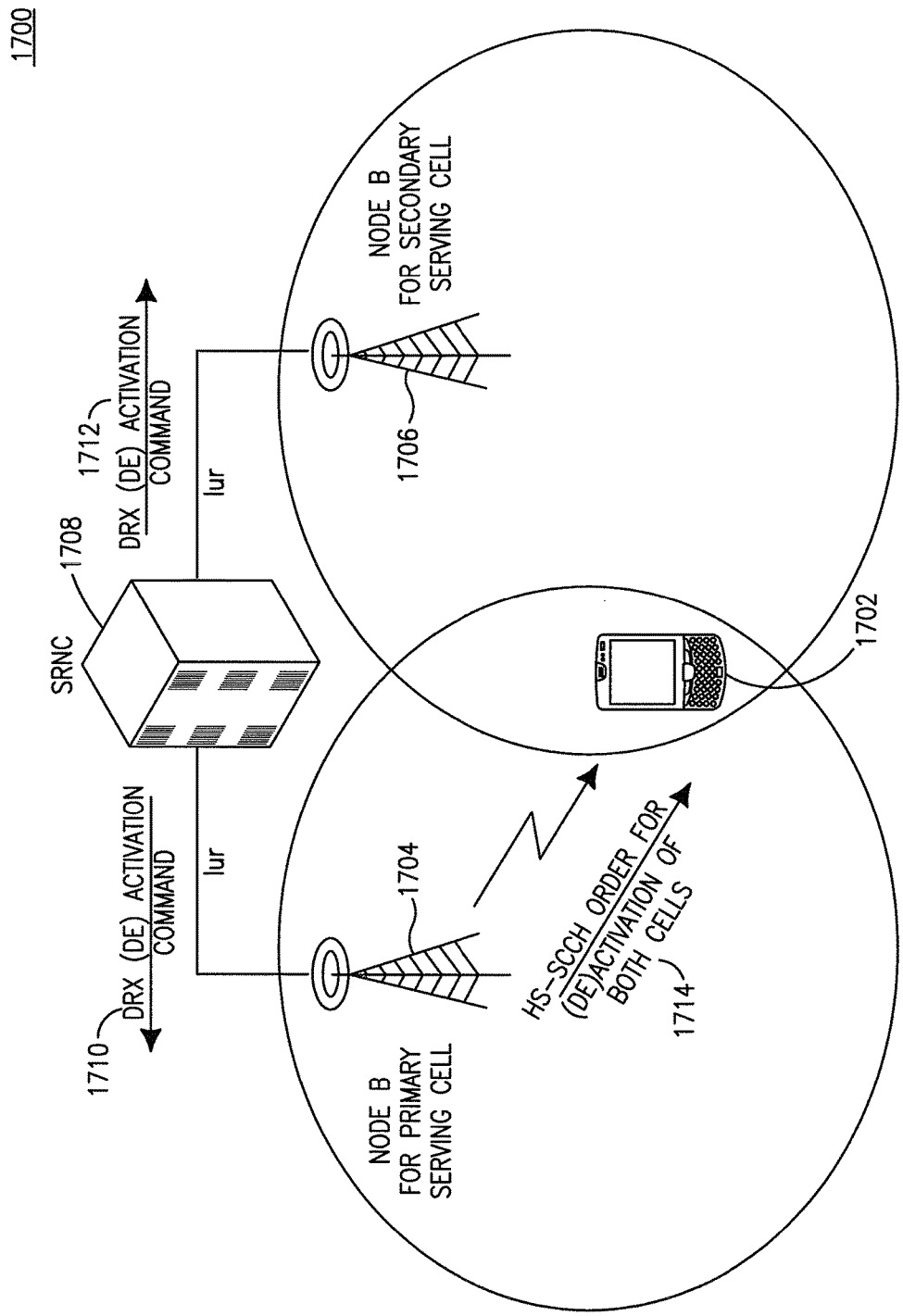
FIG. 17 is a diagram showing an RNC-controlled DRX activation/deactivation procedure.

FIG. 17 shows the RNC controlled DRX activation/deactivation procedure 1700. In the procedure 1700, a WTRU 1702 communicates with a Node B for the primary serving cell 1704 and a Node B for the secondary serving cell 1706. The Node Bs 1704 and 1706 communicate with a serving RNC (SRNC) 1708.

The SRNC 1708 sends a DRX activation or deactivation command to the Node B 1704 (step 1710) and to the Node B 1706 (step 1712). It is noted that steps 1710 and 1712 may occur simultaneously or in a reversed order (so that step 1712 happens before step 1710) without affecting the operation of the procedure 1700. After receiving the command from the SRNC 1708, the Node B 1704 sends a HS-SCCH order for activation or deactivation of both the primary cell and the secondary cell to the WTRU 1702 (step 1714).

Alternatively, DRX mode may only be allowed in the primary serving cell. The Node B that serves the primary serving cell may communicate the DRX activation/deactivation with the SRNC either by notification-based or handshake-based methods as described above. When the Node B that serves as the secondary serving cell receives the DRX activation command (or notification) from the SRNC, it may signal a cell deactivation order over the HS-SCCH to the WTRU to deactivate the entire transmission from the secondary serving cell during the DRX operation mode. When the Node B that serves as the secondary serving cell receives the DRX deactivation command from the SRNC, it may signal a cell activation order over the HS-SCCH to the WTRU to re-activate the secondary serving cell. Alternatively, when the SRNC receives the DRX activation notification for the Node B that serves as the primary serving cell, it simply stop sending data to the secondary Node B. Therefore, the secondary serving cell operates as if it is deactivated, so that WTRU does not need to monitor the transmission from the secondary serving cell during the DRX mode.

Network behavior upon the DRX activation or deactivation is described below. With the multipoint transmission operating in inter-Node B mode or inter-site mode, there may be more than one MAC entity residing at different Node Bs. Thus, the serving RNC needs to split the data from the higher layers and dispatch the data to each of the MAC buffers. To avoid unnecessary RLC retransmissions, the serving RNC monitors the scheduling activities of each Node B and distributes the appropriate amount of data to them.

Upon receiving the DRX activation notification from the initiating Node B, the SRNC is required to stop distributing any data to the MAC buffer at the Node B, or reduce the data size to a level that may be handled by the DRX mode. The remaining data traffic from higher layers, if there is a large amount, is directed to the MAC(s) of the other serving cells. In this case, the action to activate DRX for the other serving cell may be deferred until the data is sent.

Because of the latency in receiving the activation notification message, the data splitting function at the SRNC may still distribute some data to the initiating Node B after it enters DRX mode. This data may take an excessive amount of time to transmit, due to the inactive transmission status of that Node B. In this case, the SRNC may re-distribute the same data to other Node Bs if it can foresee what is happening after it receives the activation notification. At the initiating Node B, it is better to flush its MAC buffer and remain in DRX mode.

For the handshake-based or RNC-controlled activation procedures, the serving RNC controls everything, therefore the data splitting or redirecting issue is of less concern.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor; and
a receiver; and
the receiver configured to receive a first physical downlink control channel (PDCCH) of a first cell of a first network node and to receive a second PDCCH of a second cell of a second network node, wherein the first cell and the second cell have different carrier frequencies, wherein the first PDCCH is associated with a first radio network terminal identifier (RNTI) and includes a first modulation and coding set (MCS), wherein the second PDCCH is associated with a second RNTI and includes a second MCS, wherein the first and the second RNTI are different and the first and the second MCS are different;
the receiver is further configured to receive a first physical downlink shared channel (PDSCH) of the first cell based on the first PDCCH and to receive a second PDSCH of the second cell based on the second PDCCH, wherein the reception of the first PDSCH and the second PDSCH overlap in time.

2. The WTRU of claim 1, wherein the first PDCCH and the second PDCCH include different precoding weight information for the respective first and second PDSCHs.

3. The WTRU of claim 1, wherein the first PDCCH and the second PDCCH include different redundancy versions for the respective first and second PDSCHs.

4. The WTRU of claim 1, wherein the first PDCCH and the second PDCCH have different scrambling codes.

5. The WTRU of claim 1, wherein the first PDSCH and the second PDSCH have different scrambling codes.

6. The WTRU of claim 1, wherein the first network node splits data and sends a portion of the split data to the second network node for transmission to the WTRU.

7. The WTRU of claim 1, wherein the receiver and a transmitter are configured to receive a radio resource control (RRC) message from the first network node with configuration information for the second network node.

8. A method performed by a wireless transmit/receive unit (WTRU), the method comprising:
receiving a first physical downlink control channel (PDCCH) of a first cell of a first network node and to receive a second PDCCH of a second cell of a second network node, wherein the first cell and the second cell have different carrier frequencies, wherein the first PDCCH is associated with a first radio network terminal identifier (RNTI) and includes a first modulation and coding set (MCS) wherein the second PDCCH is associated with a second RNTI and includes a second MCS, wherein the first and the second RNTI are different and the first and the second MCS are different;
receiving a first physical downlink shared channel (PDSCH) of the first cell based on the first PDCCH and to receive a second PDSCH of the second cell based on the second PDCCH, wherein the receiving of the first PDSCH and the second PDSCH overlap in time.

9. The method of claim 8, wherein the first PDCCH and the second PDCCH include different precoding weight information for the respective first and second PDSCHs.

10. The method of claim 8, wherein the first PDCCH and the second PDCCH include different redundancy versions for the respective first and second PDSCHs.

11. The method of claim 8, wherein the first PDCCH and the second PDCCH have different scrambling codes cell.

12. The method of claim 8, wherein the first PDSCH and the second PDSCH have different scrambling codes.

13. The method of claim 8, wherein the first network node splits data and sends a portion of the split data to the second network node for transmission to the WTRU.

14. The method of claim 8 further comprising receiving a radio resource control (RRC) message from the first network node with configuration information for the second network node.

* * * * *